(12) United States Patent
O'Connor et al.

(10) Patent No.: US 8,869,063 B2
(45) Date of Patent: Oct. 21, 2014

(54) METHOD AND SYSTEM FOR HOLISTIC PROJECT MANAGEMENT

(75) Inventors: Tim O'Connor, Redding, CT (US); Eric Seal, Ridgefield, CT (US); Michael Inniss, Miami, FL (US)

(73) Assignee: Bank of America Corporation, Charlotte, NC (US)

( * ) Notice: Subject to any disclaimer, the term of this patent is extended or adjusted under 35 U.S.C. 154(b) by 2957 days.

(21) Appl. No.: 10/905,173

(22) Filed: Dec. 20, 2004

(65) Prior Publication Data

US 2006/0136871 A1 Jun. 22, 2006

(51) Int. Cl.
*G06Q 10/06* (2012.01)

(52) U.S. Cl.
CPC ................................ *G06Q 10/06* (2013.01)
USPC ........... 715/810; 717/101; 717/103; 717/104; 717/113

(58) Field of Classification Search
USPC .......... 717/113, 103, 101, 104, 106; 715/810; 705/7
See application file for complete search history.

(56) References Cited

U.S. PATENT DOCUMENTS

| | | | | |
|---|---|---|---|---|
| 6,725,183 | B1 * | 4/2004 | Cawse .............................. | 703/2 |
| 7,222,330 | B2 * | 5/2007 | Bicknell et al. ............... | 717/101 |
| 7,286,999 | B2 * | 10/2007 | Majd et al. ....................... | 705/8 |
| 7,302,674 | B1 * | 11/2007 | Gladieux et al. .............. | 717/101 |
| 2003/0135399 | A1 * | 7/2003 | Ahamparam et al. ............ | 705/7 |
| 2004/0054565 | A1 * | 3/2004 | Nemecek et al. ................. | 705/7 |
| 2004/0073886 | A1 * | 4/2004 | Irani ............................. | 717/101 |
| 2004/0181446 | A1 * | 9/2004 | Vance ............................. | 705/11 |
| 2004/0255265 | A1 * | 12/2004 | Brown et al. .................. | 717/101 |
| 2005/0197952 | A1 * | 9/2005 | Shea et al. ....................... | 705/38 |
| 2006/0010418 | A1 * | 1/2006 | Gupta et al. .................. | 717/101 |
| 2006/0041447 | A1 * | 2/2006 | Vucina et al. ..................... | 705/1 |
| 2006/0136922 | A1 * | 6/2006 | Zimberg et al. ............... | 718/100 |

* cited by examiner

*Primary Examiner* — Amy Ng
*Assistant Examiner* — Meseker Takele
(74) *Attorney, Agent, or Firm* — Michael A. Springs; Moore & Van Allen, PLLC; Nicholas C. Russell

(57) ABSTRACT

A method for holistic project management may include presenting a graphical user interface for a user to enter project information for a project. The method may also include determining a priority for the project based on an impact of the project to each of a plurality of predetermined drivers.

30 Claims, 25 Drawing Sheets

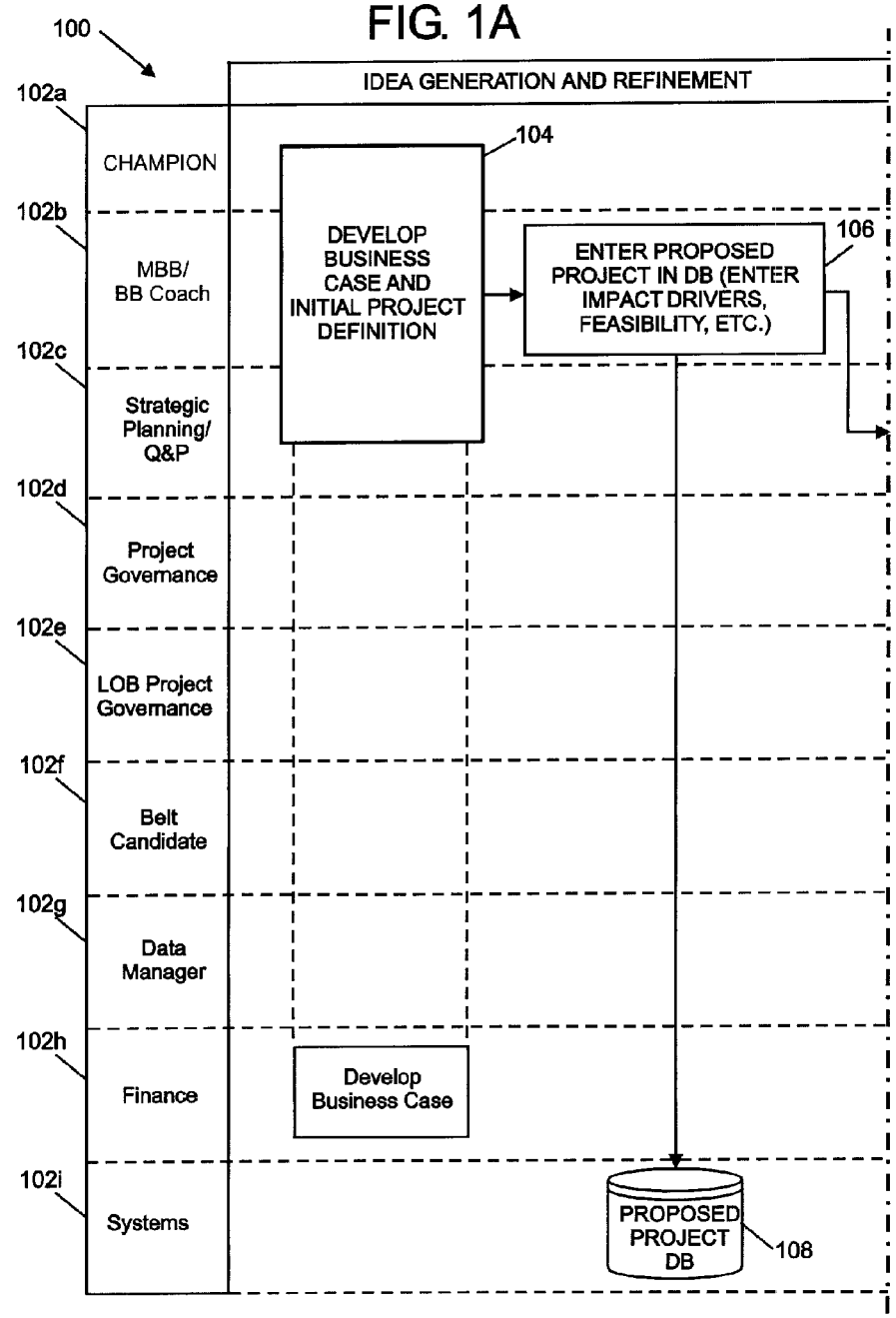

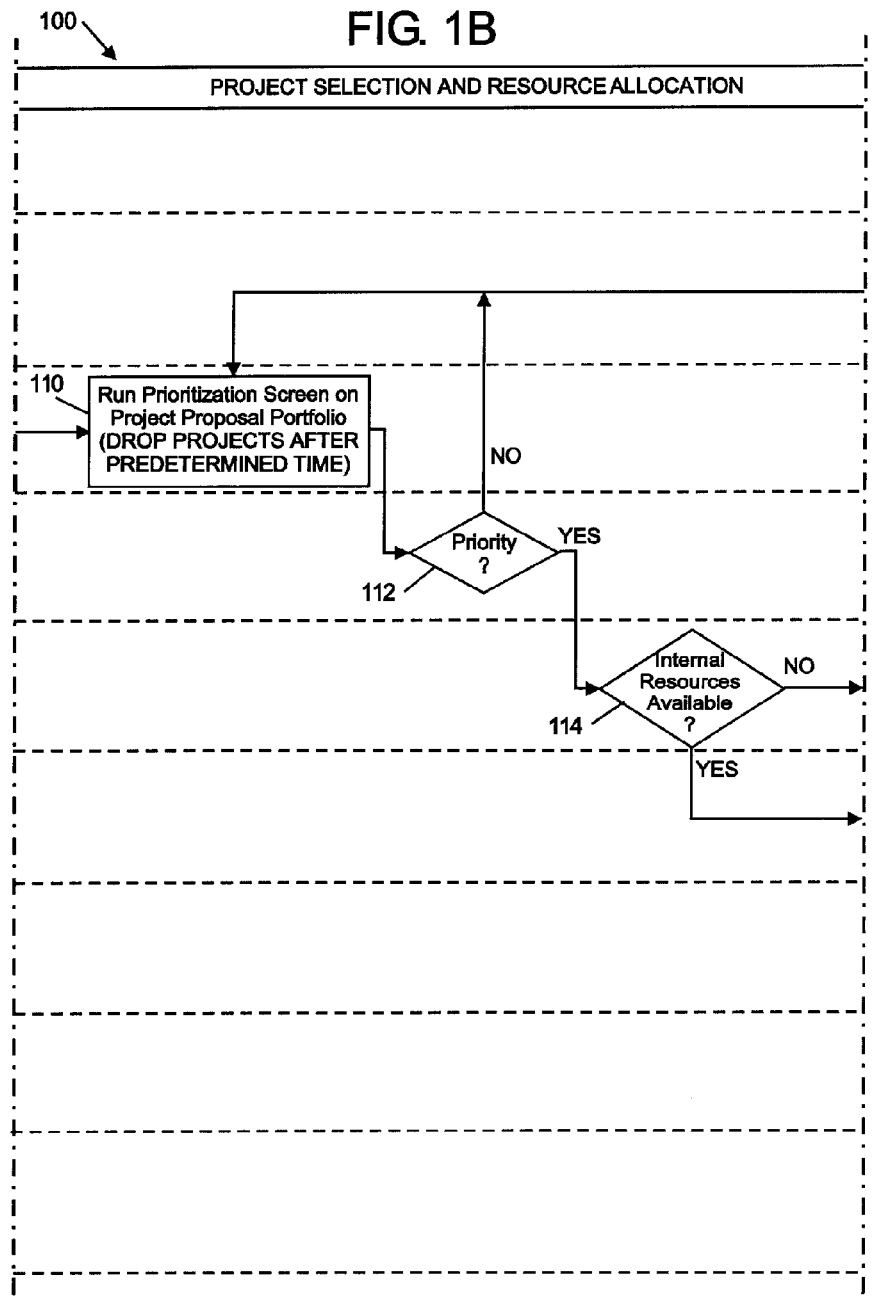

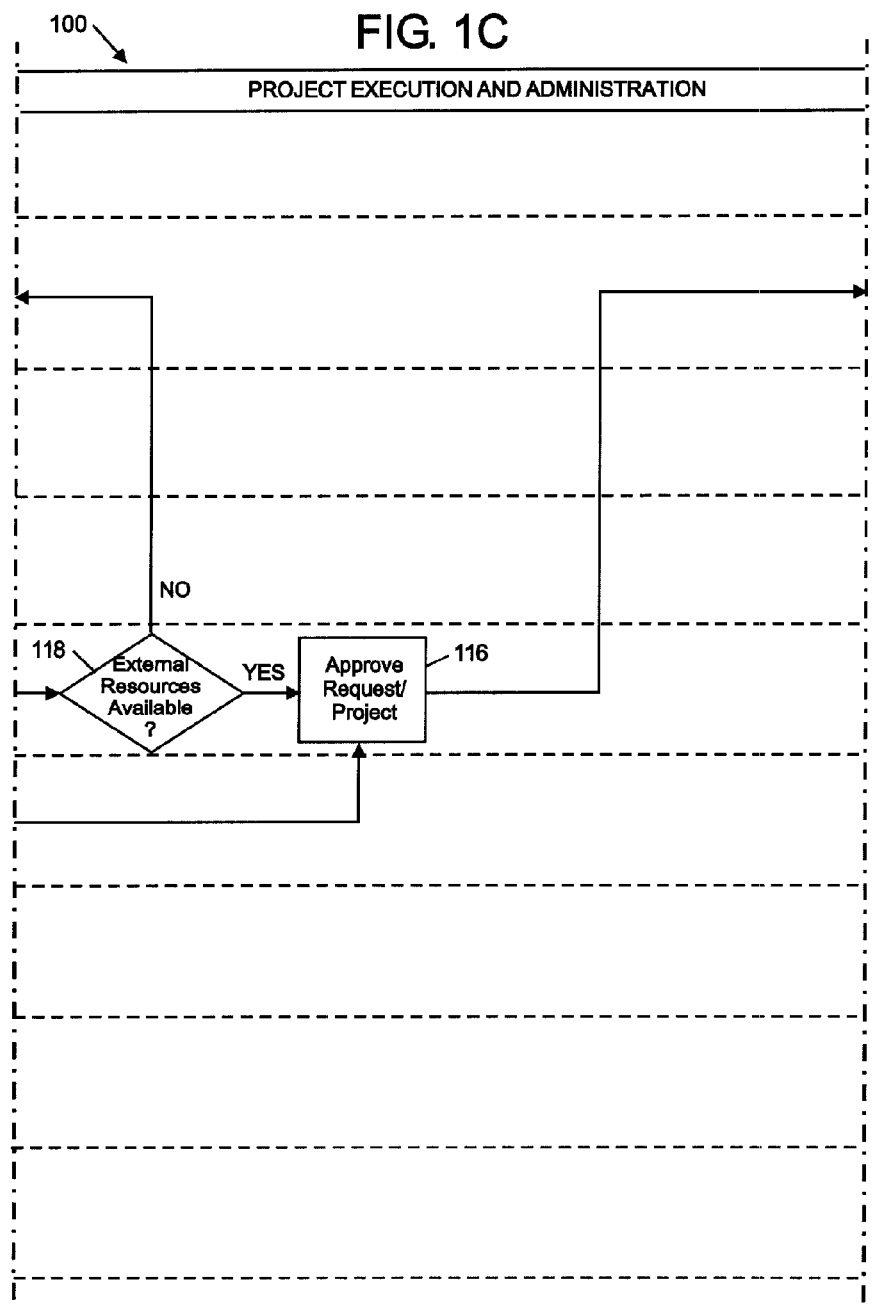

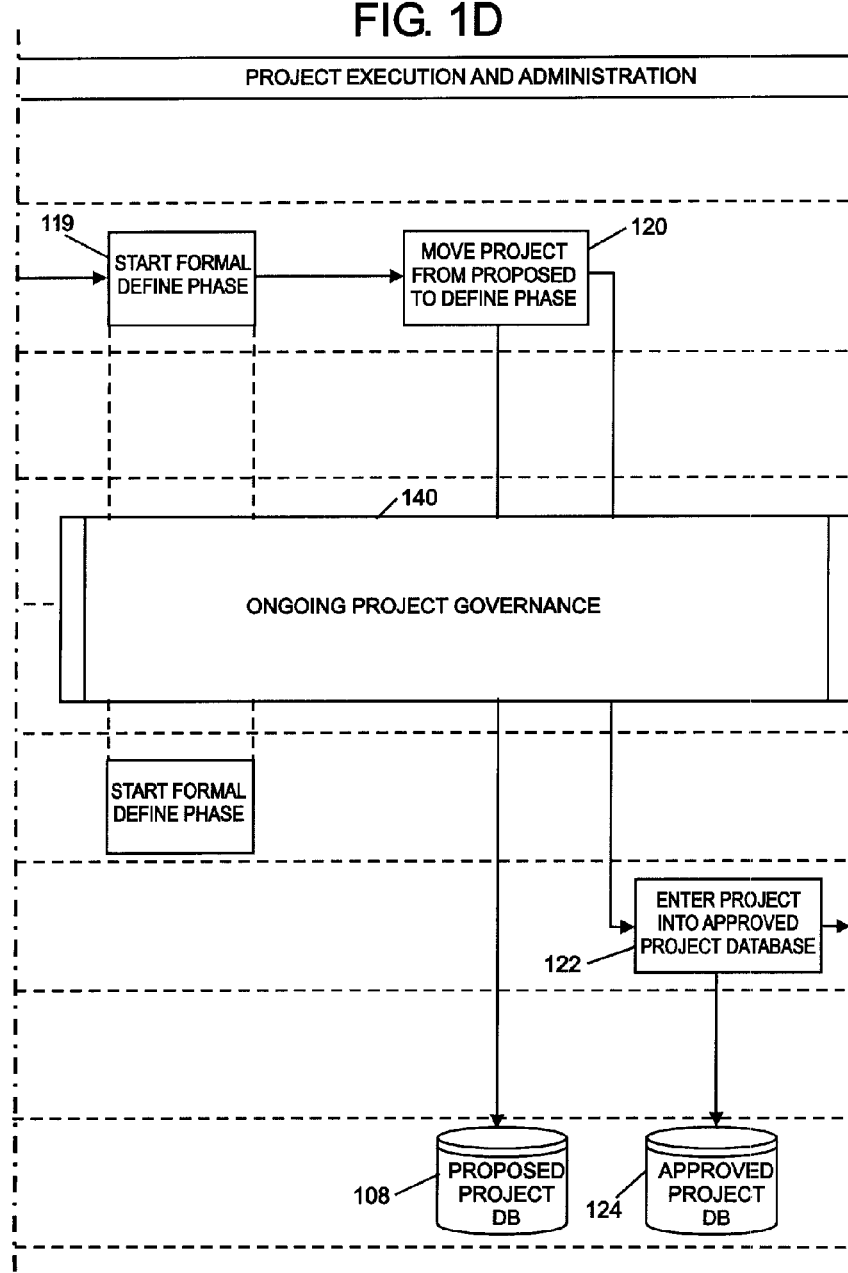

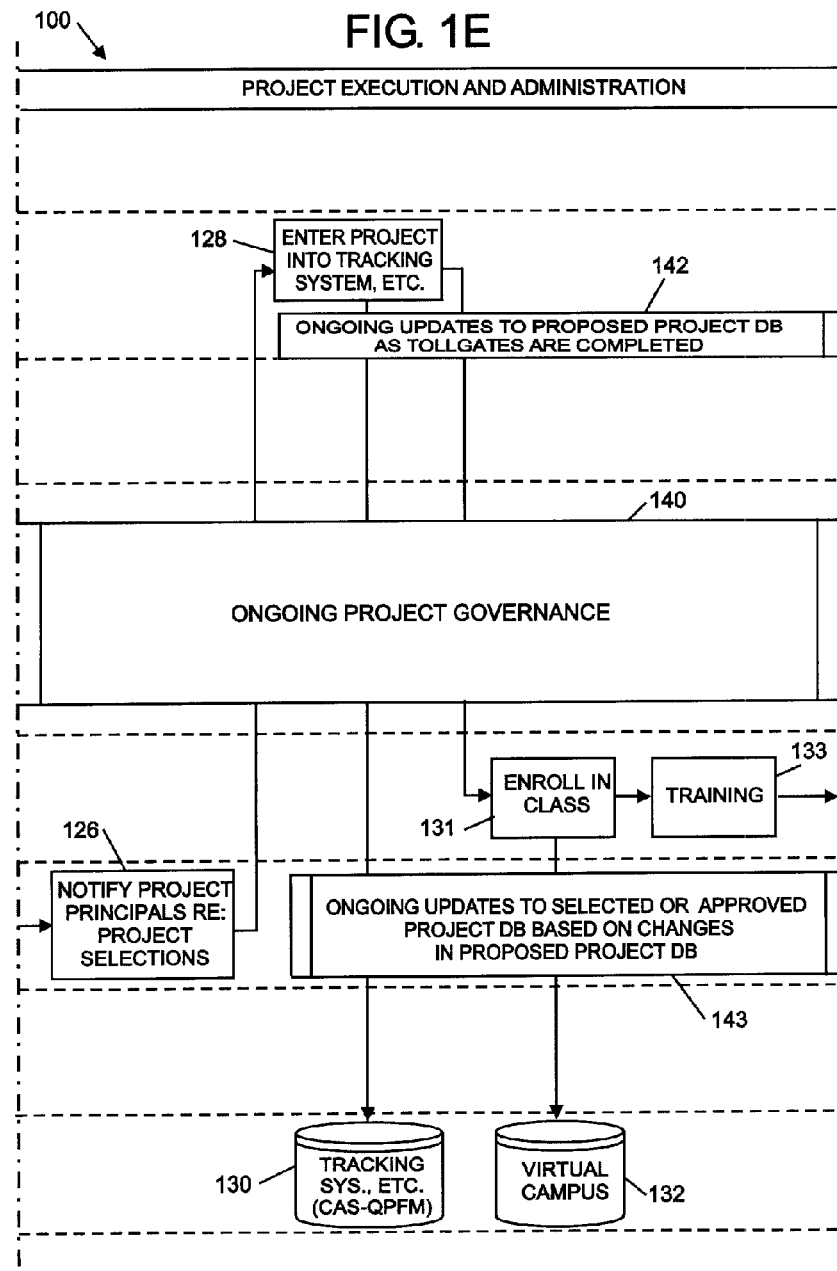

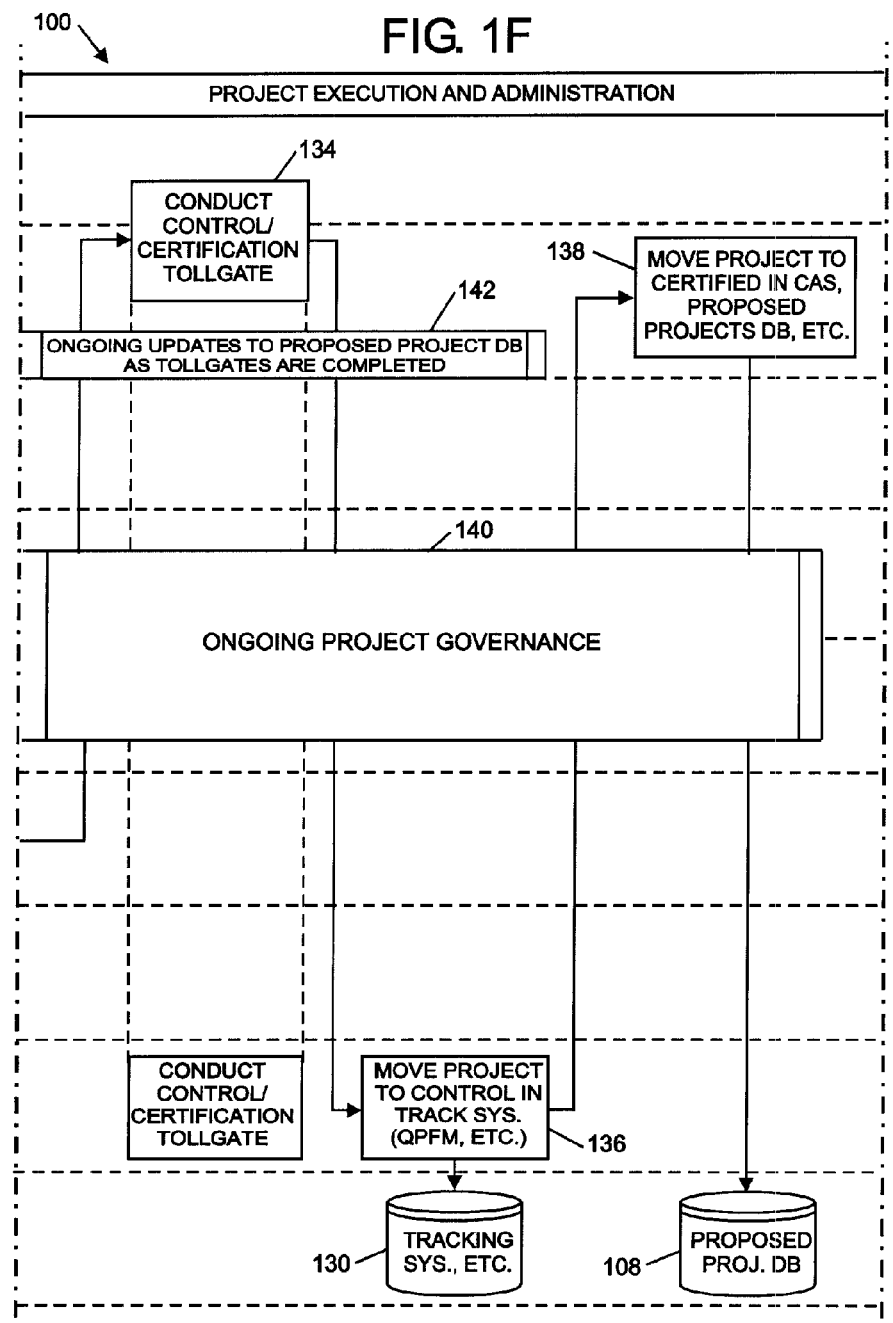

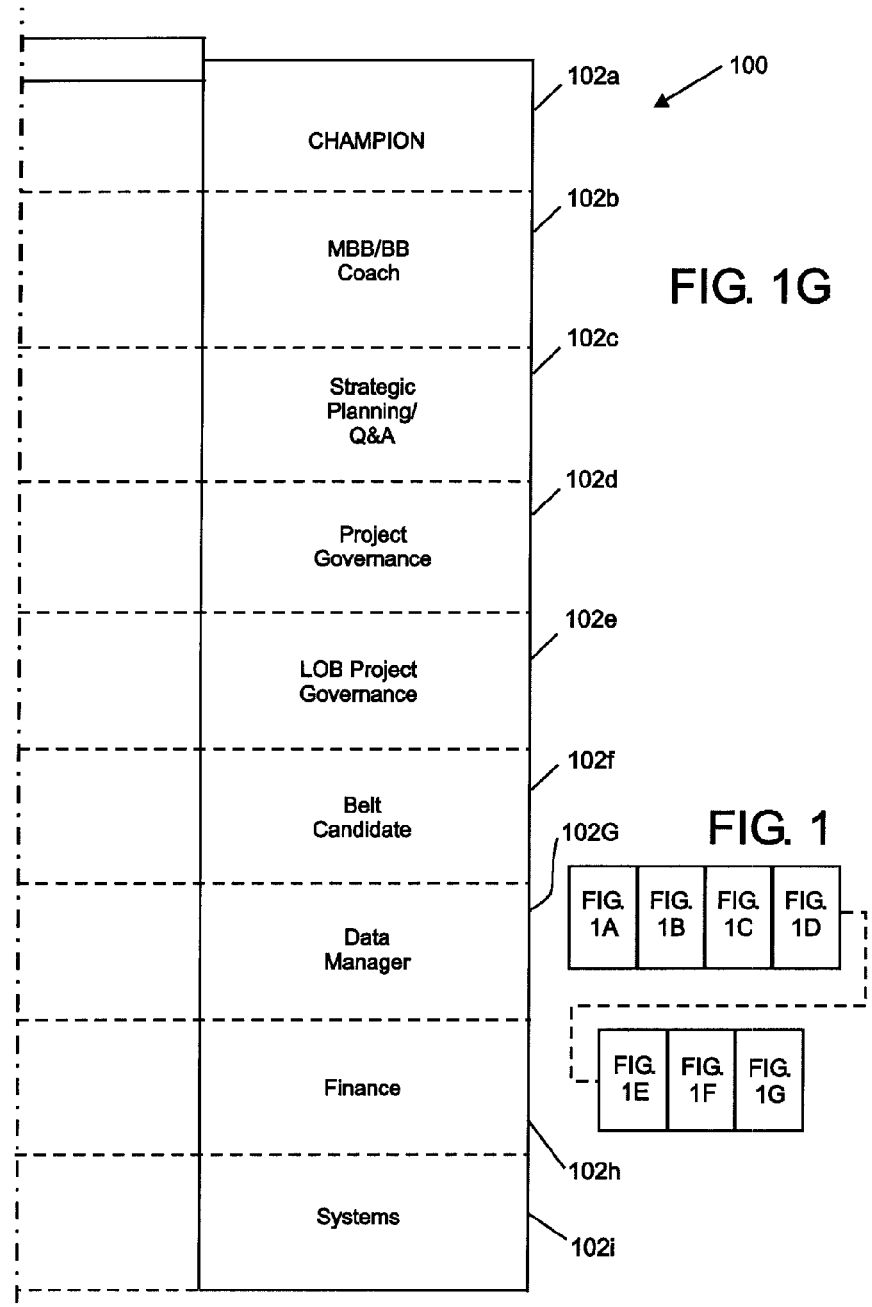

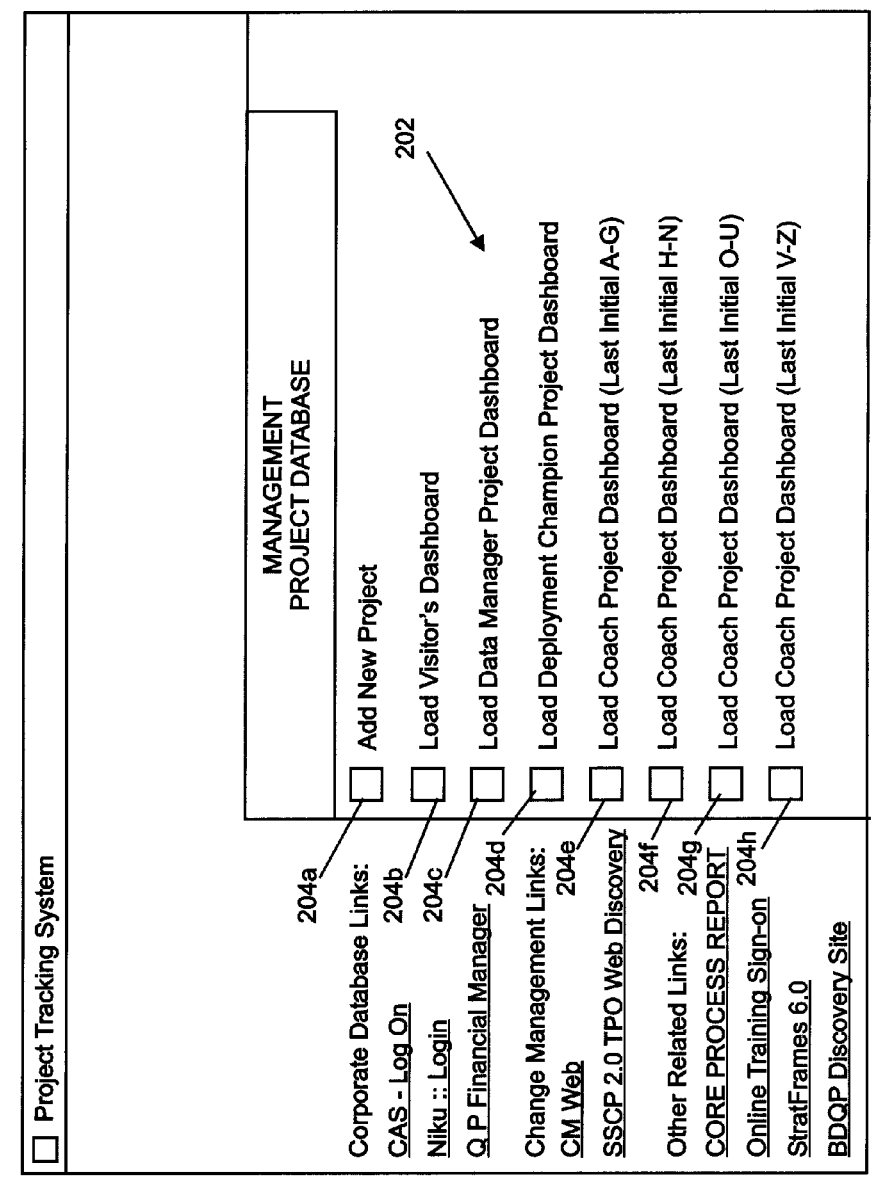

FIG. 3A

Add Project Form:Form

300

302

NEW PROJECT ENTRY FORM

| Project Era: | Legacy ▾ | Improvement Type: | Strategic ▾ | 316 |
|---|---|---|---|---|
| Type: | GB ▾ | Impacted LOB: | PB (Legacy) ▾ | |

304
306
318 — Total # of Belt Candidates: 2
320 — # of Belt Candidates: 0

Hoshin Business Alignment: [  ▾  ]

QPFM PWD  0
NIKU #

Belt 1 (Project Lead) First Name: [    ]
Belt 1 (Project Lead) Last Name: [    ]
Belt 2 First Name: [    ]
Belt 2 Last Name: [    ]
Six Sigma Coach First Name: [    ]   } 308
Six Sigma Coach Last Name: [    ]
Champion First Name: [    ]
Champion Last Name: [    ]
Finance Partner First Name: [    ]   } 310
Finance Partner Last Name: [    ]
Expected Hard Benefit (Whole $): [    ]   — 312
Expected Soft Benefit (Whole $): [    ]   — 314
Date Proposed (Automatic Field): [    ]

NIKU Project Title: Use Formula
[LOB, Type, Title, (Project Lead)]

Business Case:
(High-level, strategic reason for doing project. Describe defect and industry/bank benchmark. Succinctly state relevance.)

Problem Statement/Description:
(Define problem, duration, cost/quantity, and impact on business. Answer what, where, and when.)

Goal:
(Must be specific, measurable, attainable, relevant, and time-bound. Identify secondary metric and scope.)

Year End Compensation — 322

| | A | B | F | G | H | I |
|---|---|---|---|---|---|---|
| | Project Prioritization Spreadsheet | | | | | |
| 2 | Y's | | | | | |
| 3 | Business Driver | Importance | | | | |
| 4 | Risk | 5.0 | | | | |
| 5 | Growth | 2.9 | | | | |
| 6 | Product and Service Excellence | 2.9 | | | | |
| 7 | Customer Experience/Delight | 2.9 | | | | |
| 8 | Productivity | 1.7 | | | | |
| 9 | Associate Satisfaction | 1.7 | | | | |
| 10 | | | | | | |
| 11 | | | | | | |
| 38 | | | | | | |
| 39 | | | | | | |
| 40 | | | | | | |
| 41 | | | | | | |
| 42 | | | | | | |
| 43 | | | | | | |

Driver Weighting — 401a
Initiative Rating Matrix — 401b
Active_or_Proposed_Projects — 401c
Projects — 401d 400, 402, 404

FIG. 6A

| | A | B | C | D | E | F | G | H |
|---|---|---|---|---|---|---|---|---|
| | Project Prioritization Spread Sheet | | | | | | | |
| 1 | Projects | | | | | | | |
| 2 | Initiative / Project | | | | | | | |
| 3 | Business Driver (610) — Importance (612) | 5.0 | I | Associate Change Process ■ | Increase Revenue ■ | Credit Loss Volatility (Monitoring) ■ | ■ | ■ |
| 4 | Risk | 2.9 | M | ■ | ■ | ■ | ■ | ■ |
| 5 | Growth | 2.9 | I | ■ | ■ | ■ | ■ | ■ |
| 6 | Product and Service Excellence | 2.9 | M | ■ | ■ | ■ | ■ | ■ |
| 7 | Customer Experience/Delight | 1.7 | H | ■ | ■ | ■ | ■ | ■ |
| 8 | Productivity | 1.7 | M | ■ | ■ | ■ | ■ | ■ |
| 9 | Associate Satisfaction | ■ | ■ ■ | | | | | |
| 10 | | | | | | | | |
| 11 | 608 | | | 606 | 614 | | | |
| 12 | | | | | | | | |
| 13 | Risk | 5.0 | 5.0 | | | | | |
| 14 | Growth | 2.9 | 2.7 | | | | | |
| 15 | Product and Service Excellence | 2.9 | 2.3 | | | | | |
| 16 | Customer Experience/Delight | 2.9 | 2.7 | | | | | |
| 17 | Productivity | 1.7 | 15.3 | | | | | |
| 18 | Associate Satisfaction | 1.7 | 5.4 | | | | | |
| 19 | | ■ | ■ | | | | | |

600, 602, 604

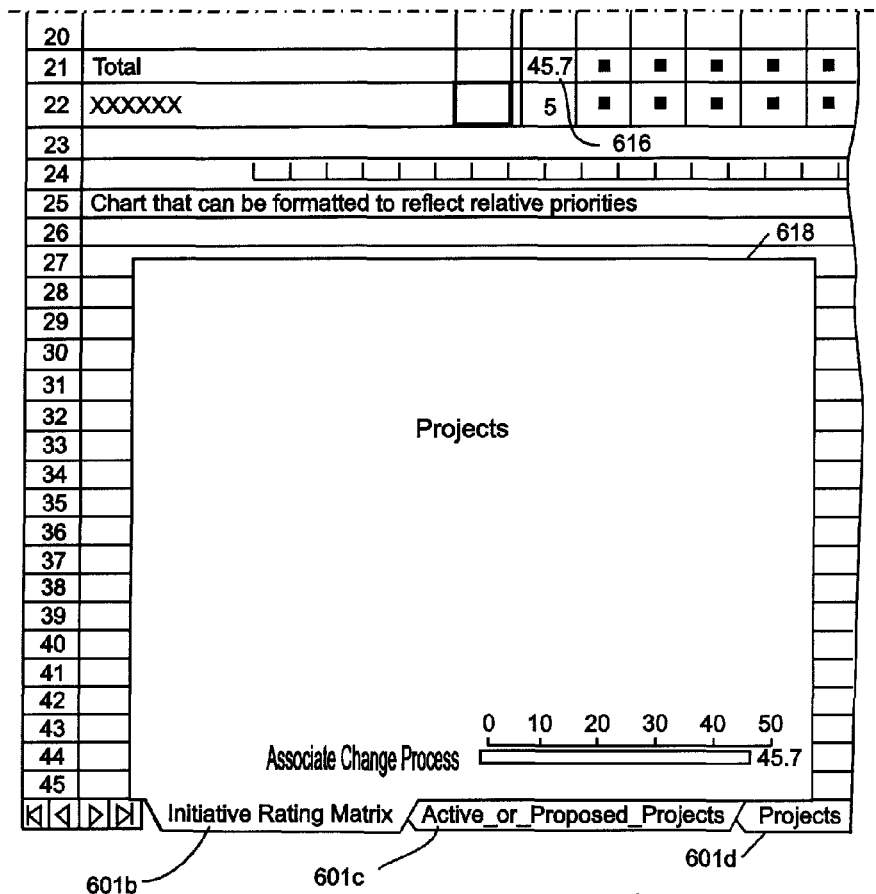
FIG. 6B
FIG. 10
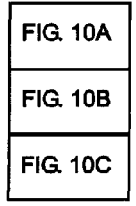
FIG. 11
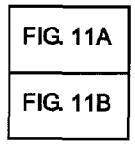
FIG. 6
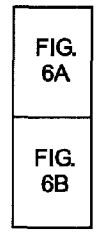

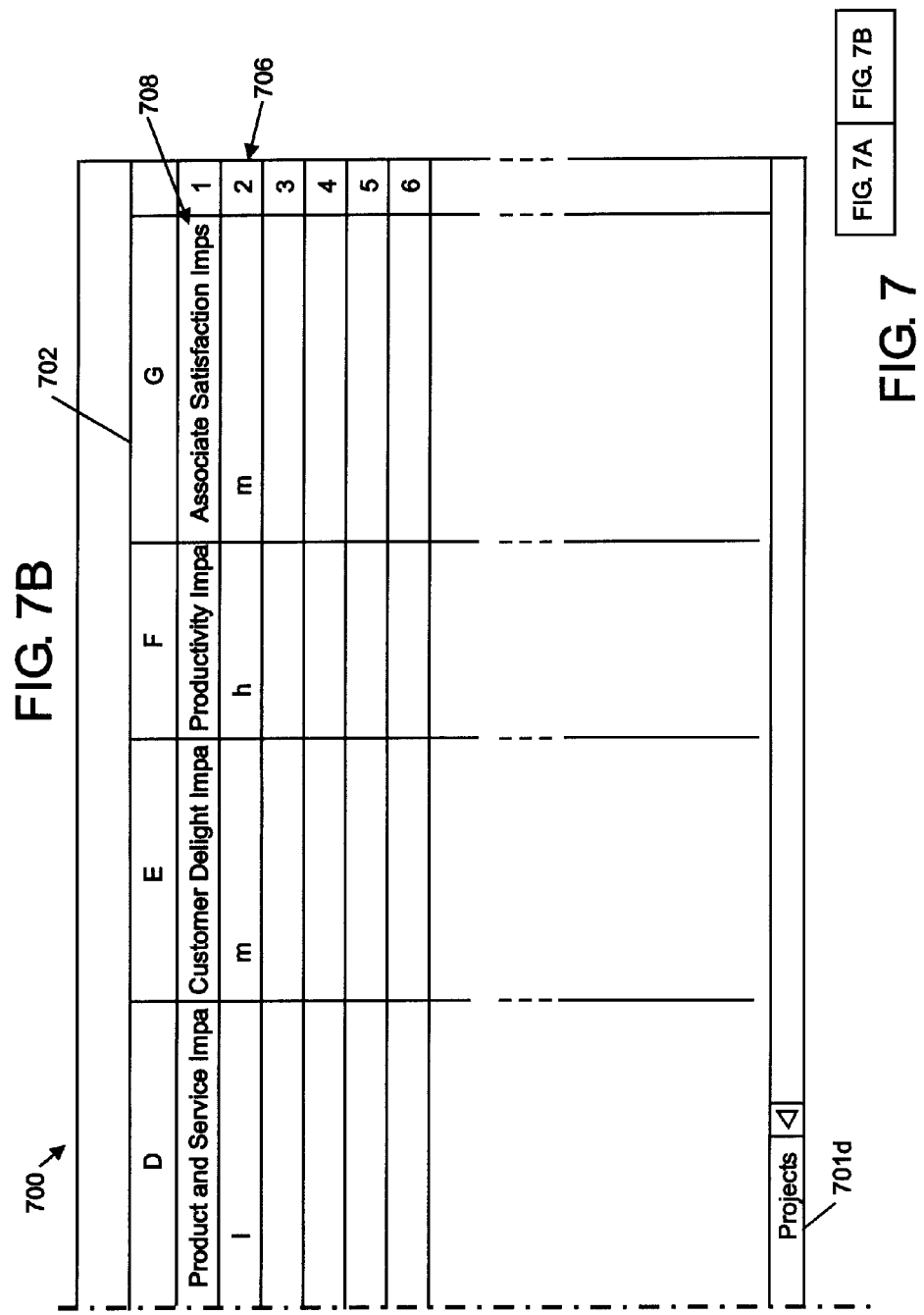

FIG. 8

| | A | D |
|---|---|---|
| | Project Title | Priority Percentage Rating (Highest Percentage is Highest Priority) |
| 1 | | |
| 2 | Associate Change Process | 29.7% |
| 3 | Increase Revenue | 0.0% |
| 4 | credit Loss Volatility (Monitoring) Collins | 0.0% |
| 5 | - Increase Revenue | 0.0% |
| ... | | |
| 25 | Fleet - Reconciliation Breaks | 0.0% |
| 26 | Fleet - Special Assets | 0.0% |
| 27 | Fleet - Corporate Actions | 0.0% |
| 28 | Fleet - Financial Printing Initiative-Autoor's Alterations | 0.0% |

Project Prioritization Spreadsheet — 800
802, 804, 806
Active_or_Proposed_Projects (801c) / Projects with Priority Number (801d)

FIG. 10A

SSHH's Projects : Form

1000

1002

PROJECT ENTRY/UPDATE FORM

- Project Era: — 1004 — Initiative
- Last Update (Automatic Field): — 1060
- Type: — 1006 — GB
- Hoshin Business Alignment: PB  33
- Belt 1 (Project Lead) First Name:
- Belt 1 (Project Lead) Last Name:
- Belt 2 First Name: — 1008
- Belt 2 Last Name:
- Six Sigma Coach First Name:
- Six Sigma Coach Last Name:
- Champion First Name:
- Champion Last Name:
- Finance Partner First Name: — 1010
- Finance Partner Last Name:
- Expected Hard Benefit (Whole $): — 1012
- Expected Soft Benefit (Whole $):
- Date Proposed (Automatic Field): — 1014

- Improvement Type: Cost Reduction
- Impacted LOB: Multiple in xxx — 1016
- Total # of Belt Candidates: 1 — 1018
- # Belt Candidates: 1 — 1020
- QPFM PWD
- NIKU #

NIKU Project Title — 1022

Business Case:
(High-level, strategic reason for doing project. Describe defect and industry/bank benchmark. Succinctly state relevance.) — 1024

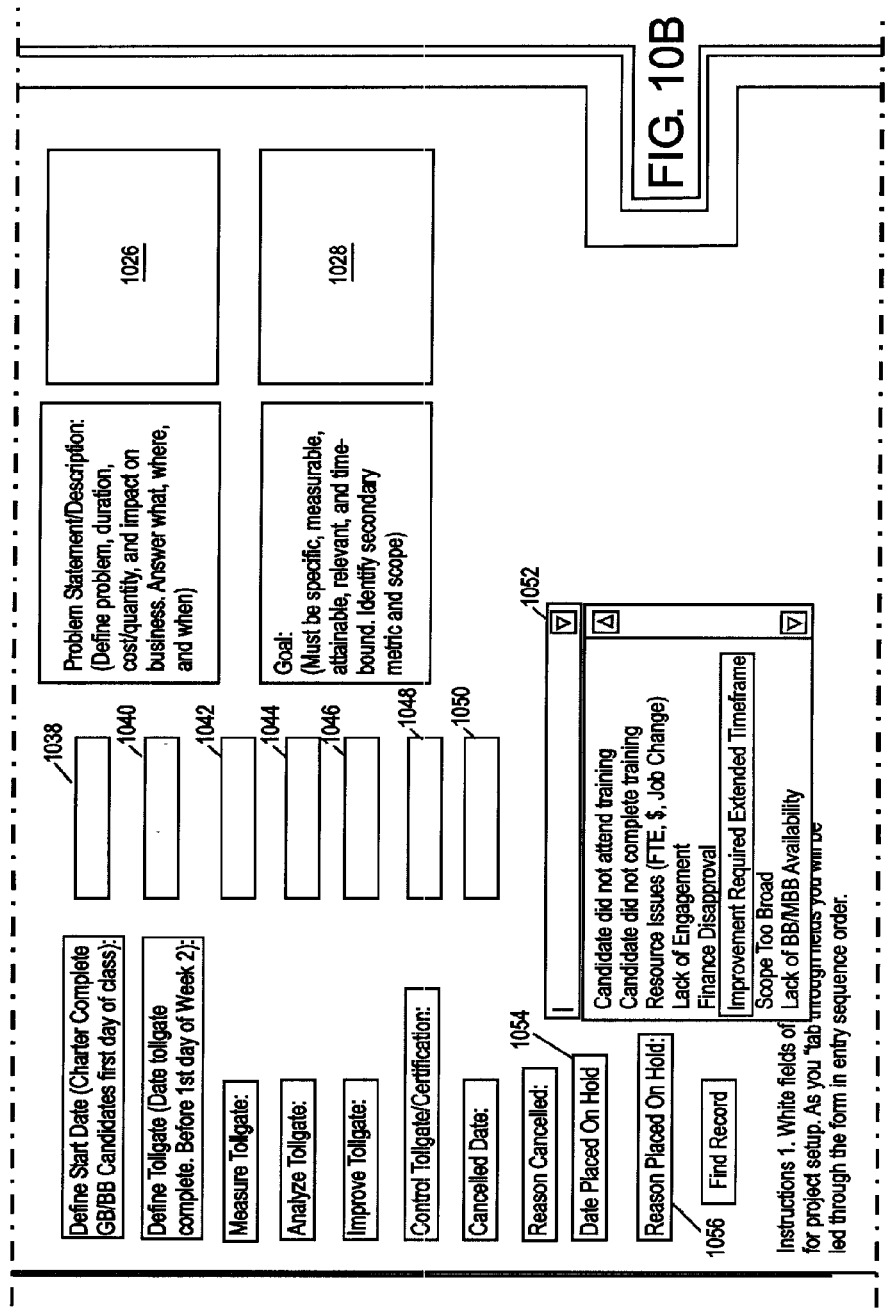

FIG. 11A

Q&R Executive's Project Metrics Report — 1100

| | E | F | G | J | K | L | M | N | O | P | Q | R | S |
|---|---|---|---|---|---|---|---|---|---|---|---|---|---|
| | Coach-Phase | # of Projects | | | | | | | | | | | |
| 1 | AA Cancelled | 15 | | | | | | | | | | | |
| 2 | AA Certified | 3 | | | | | | | | | | | |
| 3 | BB Certified | 2 | | | | | | | | | | | |
| 4 | BB On Hold | 1 | | | | | | | | | | | |
| 5 | CC Cancelled | 3 | | | | | | | | | | | |
| 6 | CC Certified | 10 | | | | | | | | | | | |
| 7 | CC On Hold | 1 | | | | | | | | | | | |
| 8 | DD Measure | 1 | | | | | | | | | | | |
| 9 | DD Proposed | 1 | | | | | | | | | | | |
| 10 | EE Cancelled | 13 | | | | | | | | | | | |
| 11 | EE Cancelled | 2 | | | | | | | | | | | |
| 12 | EE Certified | 1 | | | | | | | | | | | |
| 13 | EE Certified | 2 | | | | | | | | | | | |
| 14 | FF Proposed | 2 | | | | | | | | | | | |
| 15 | GG Certified | 2 | | | | | | | | | | | |
| 16 | GG Proposed | 1 | | | | | | | | | | | |
| 17 | HH Analyze | 1 | | | | | | | | | | | |

1102

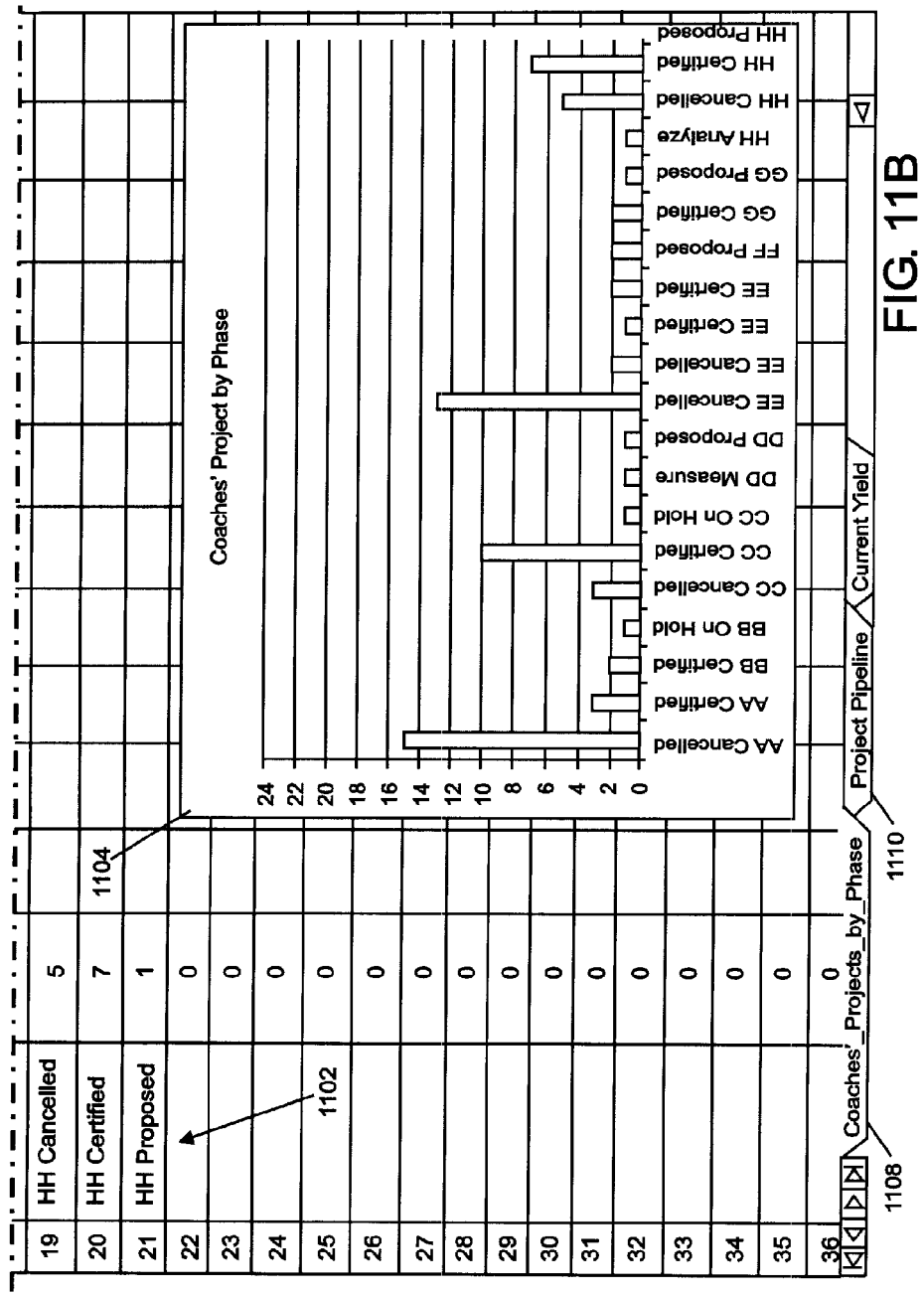

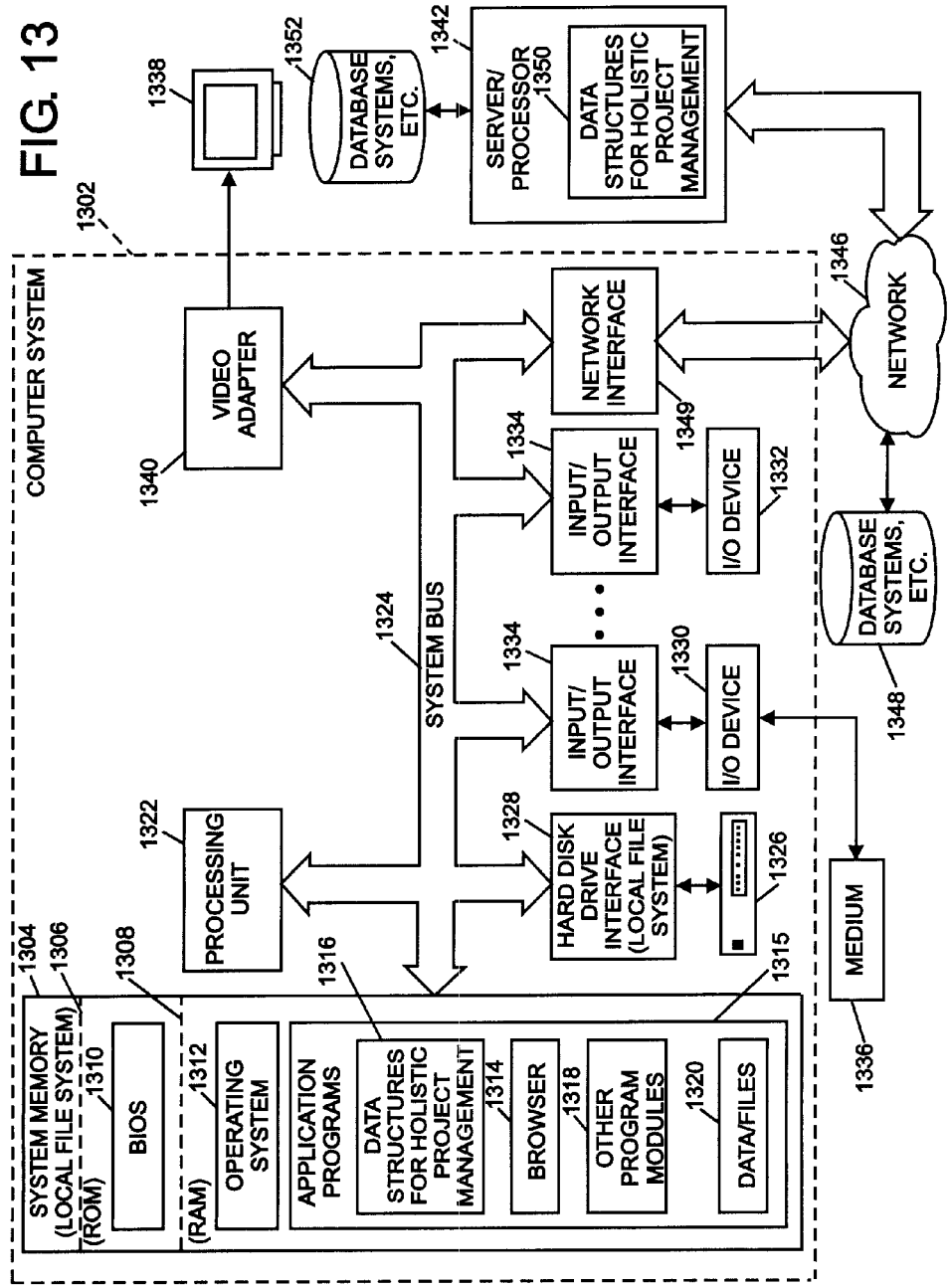

US 8,869,063 B2

METHOD AND SYSTEM FOR HOLISTIC PROJECT MANAGEMENT

COPYRIGHT NOTICE

A portion of the disclosure of this patent document contains material that is subject to copyright protection. The copyright owner has no objection to the facsimile reproduction by anyone of the patent document, or the patent disclosure, as it appears in the Patent and Trademark Office patent files or records, but otherwise reserves all copyright rights whatsoever.

BACKGROUND OF INVENTION

The present invention relates to project management and the like and more particularly to a method and system for holistic project management.

Multiple, complex systems may be used within an organization to track and monitor projects, such as Six Sigma projects or the like, and to provide data to coaches, project managers and senior management. However, there are no known automated methods or systems for use with such projects that include prioritization, governance and project management capabilities and features in a single integrated system. Additionally, there are no known offerings or solutions that offer a complete or holistic means to track and manage a portfolio of multiple projects from proposal, through governance to completion. Consequently, data can be lost, promising projects or opportunities missed or mismanaged, corporate processes circumvented and inertia lost in implementing projects because of administrative stumbling blocks or roadblocks.

SUMMARY OF INVENTION

In accordance with an embodiment of the present invention, a method for holistic project management may include presenting a graphical user interface for a user to enter project information for a project. The method may also include determining a priority for the project based on an impact of the project to each of a plurality of predetermined drivers.

In accordance with another embodiment of the present invention, a method for holistic project management may include presenting a graphical user interface for a user to enter project information for a project and determining a priority for the project based on an impact of the project to each of a plurality of predetermined drivers. The method may also include providing means to enter or select a level of impact for each of the plurality of predetermined drivers including a risk driver; a growth driver; a product and service driver; a customer delight driver; a productivity driver; and an associate satisfaction driver. The method may further include determining the priority as a function of a level of importance assigned to each of selected ones of the plurality of predetermined drivers and the predicted impact selected for each driver.

In accordance with another embodiment of the present invention, a system for holistic project management may include a data structure operable on a processor to present a graphical user interface for a user to enter project information. The system may also include a data structure operable on the processor to determine a priority for the project based on an impact of the project to each of a plurality of predetermined drivers.

In accordance with a further embodiment of the present invention, a computer-readable medium having computer executable instructions for performing a method that may include presenting a graphical user interface for a user to enter project information for a project. The method may also include determining a priority for the project based on an impact of the project to each of a plurality of predetermined drivers.

DESCRIPTION OF THE DRAWINGS

FIGS. 1A-1G (collectively FIG. 1) are a flow chart of an example of a method for holistic project management in accordance with an embodiment of the present invention.

FIG. 2 is an example of a web page, graphical user interface (GUI) or the like of a main menu or dashboard for a holistic project management system in accordance with an embodiment of the present invention.

FIGS. 3A and 3B (collectively FIG. 3) are an example of a web page, GUI or the like of an entry form to enter data related to a new project to a holistic project management system in accordance with an embodiment of the present invention.

FIG. 4 is an example of a web page, GUI or the like of a spreadsheet illustrating examples of business driver weightings for a holistic project management system in accordance with an embodiment of the present invention.

FIGS. 6A and 6B (collectively FIG. 6) are an example of a web page, GUI or the like of an Initiative Rating Matrix generable by a holistic project management system in accordance with an embodiment of the present invention.

FIGS. 7A and 7B (collectively FIG. 7) are an example of a web page, GUI or the like of a spreadsheet illustrating active or proposed projects generable by a holistic project management system in accordance with an embodiment of the present invention.

FIG. 8 is an example of a web page, GUI or the like of a spreadsheet illustrating examples of priority percentage ratings for each project entered in a holistic project management system in accordance with an embodiment of the present invention.

FIGS. 10A, 10B and 10C (collectively FIG. 10) are an example of a web page, GUI or the like illustrating an entry form for a project manager to enter or update information or data related to a project in a holistic project management system in accordance with an embodiment of the present invention.

FIGS. 11A and 11B (collectively FIG. 11) are an example of a web page, GUI or the like of a table and chart illustrating each coach's or project manager's projects by phase for a holistic project management system in accordance with an embodiment of the present invention.

FIG. 13 is a block diagram of an exemplary system for holistic project management in accordance with an embodiment of the present invention.

DETAILED DESCRIPTION

Figure 5:
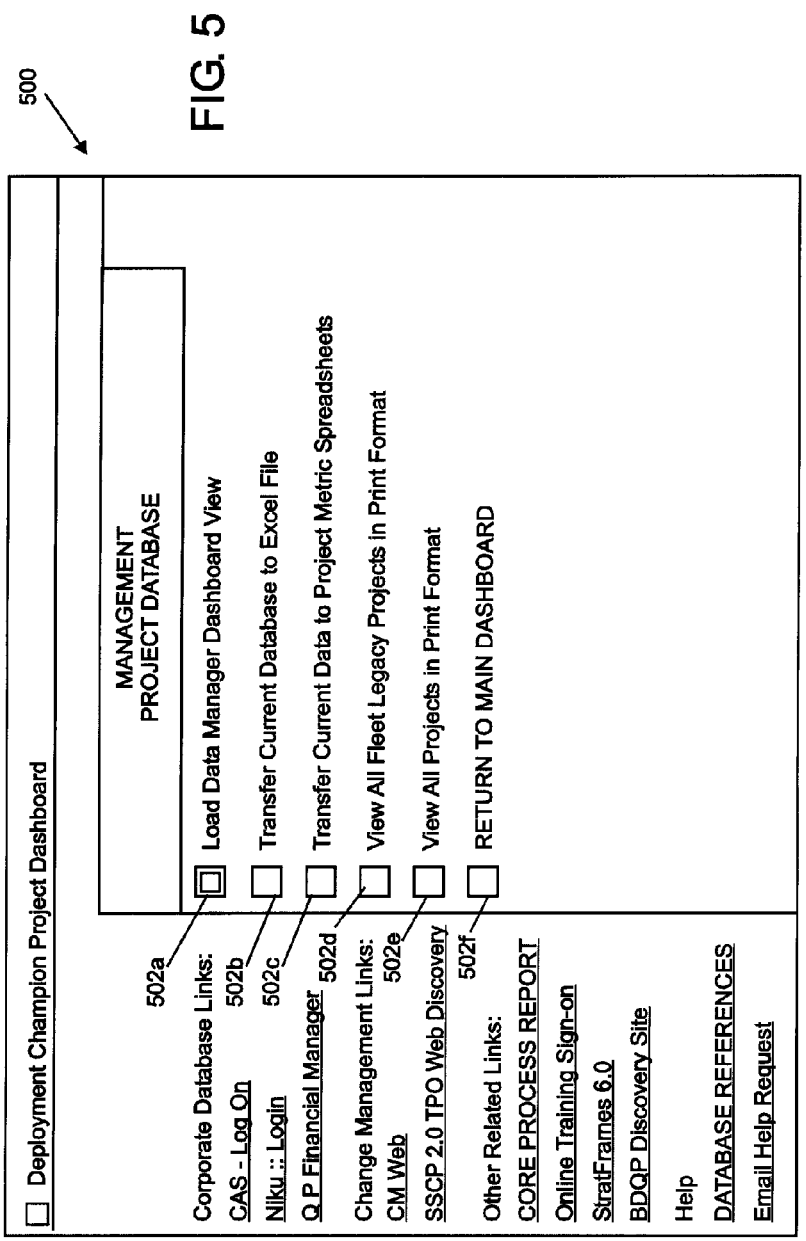
FIG. 5 is an example of a web page, GUI or the like of a menu for a user, deployment champion or the like to select different operations or views within a holistic project management system in accordance with an embodiment of the present invention.

The following detailed description of preferred embodiments refers to the accompanying drawings, which illustrate specific embodiments of the invention. Other embodiments having different structures and operations do not depart from the scope of the present invention.

FIGS. 1A-1G (collectively FIG. 1) are a flow chart of an example of a method 100 for holistic project management in accordance with an embodiment of the present invention. The method 100 may form part of or be used by a system for holistic project management, such as exemplary system 1300 illustrated in FIG. 13 or the like. The flow chart is divided into different sections 102 or "swim lanes" to illustrate the entity, individual or group that may be responsible for the operation or function identified in the particular block. This is not to imply that the particular function can or should be performed by the entity, individual or group indicated by the associated segment or lane 102. Examples of the different entities, individuals or groups that may perform the different functions or operations illustrated in FIG. 1 are identified by terminology that is typically used in "Six Sigma" Quality Management. The Six Sigma terminology is used herein merely as a example in describing the present invention and the present invention is not intended to be limited in anyway by the Six Sigma terminology used or the entity, individual or group with which a particular block, function or operation may be associated. More detailed information about Six Sigma may be found in *What is Six Sigma?*, by Peter Pande and Larry Holpp (McGraw-Hill 2002).

In block 104, a business case may be developed and an initial project definition created or formed. This operation may be performed at least in part by all entities 102a-102h as illustrated in FIG. 1.

In block 106, the proposed project may be entered into a database or database system, such as a proposed project database 108, database system or the like. The proposed project database 108 may be a specific database or designated memory location or area within a database system, memory system or data source. The proposed project may be entered via a web page, GUI or the like.

FIG. 2 is an example of a web page, GUI 200 or the like of a main menu 202 or dashboard for a holistic project management system in accordance with an embodiment of the present invention. The GUI 200 may be generated by the method 100 in block 126. The main menu 202 may include different radio buttons 204 or similar means to access different aspects, web pages, GUIs, data or the like associated with the holistic project management system. For example, a radio button 204a, which may be labeled "Add New Project" or a similar label indicative of the function of the button, may be operated to present another web page or GUI that may present an entry form to enter information or data related to a new project to be entered into the holistic project management system. Any of the radio buttons 204 may be operated or activated by "clicking-on" the selected button 204 with a computer pointing device, such as a mouse or the like.

Figures 3, 3A, 3B:
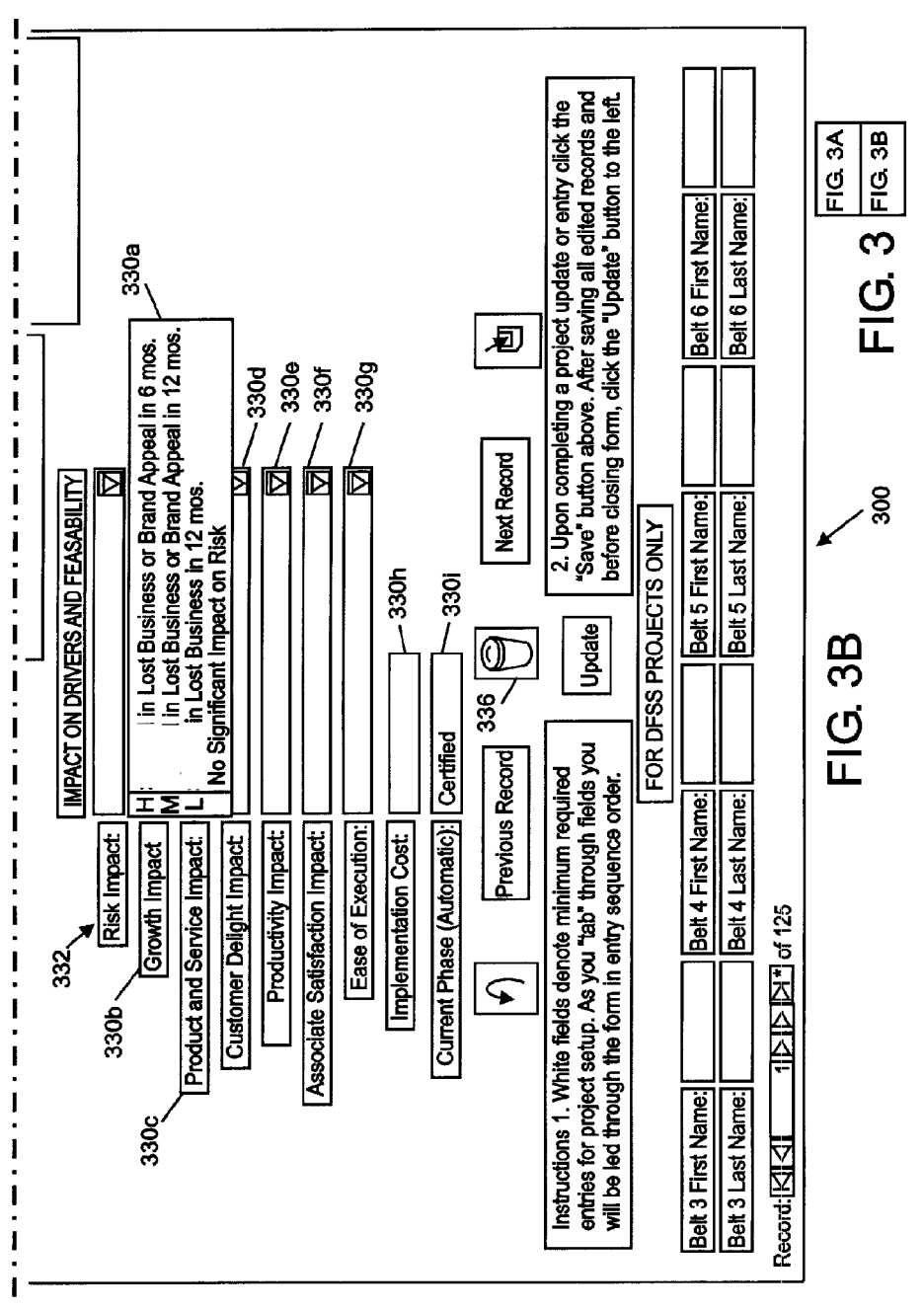

FIGS. 3A and 3B (collectively FIG. 3) are an example of a web page, GUI 300 or the like of an entry form 302 to enter data related to a new project into a holistic project management system in accordance with an embodiment of the present invention. The GUI 300 may be generated by the method 100 or the holistic project management system in response to a user clicking-on button 204a. The entry form 302 may include numerous fields to enter data related to a new project. For example a "Project Era" field 304 or drop-down list may be provided to enter an era or time relationship when the new project may have been first entered or created. A project type field 306 or drop-down list may be provided to further classify the project. Fields 308 may also be provided to enter names for individuals or project managers responsible for managing different aspects of the project.

The form 302 may include an "Expected Hard Benefit" field 310 to enter an expected financial benefit in dollars or the like. A "Date Proposed" field 312 may also be included. Examples of other identification or classification type fields that may be included in the form 302 may be "Expected Soft Benefit Field" 312; "Date Proposed" field 314; "Improvement Type" field 316; "Impacted LOB" or line of business impacted field 318; "Total # of Belt Candidates" field 320 and the like. Further examples of fields in form 302 may include a project title field 322; a business case field 324; a problem statement/description field 326; and a goal field 328. The business case field 324 may include a high-level, strategic reason for doing the project. The business case field 324 may also describe defects and industry or company benchmarks or the like. The problem statement/description field 326 may define the problem, duration, cost/quality, and impact on the business or entity. The problem statement/description may answer what, where and when. The goal field 328 may include specific, measurable, attainable, relevant, time-bound goals. The goal field may also identify secondary metrics and scope of the project.

In accordance with an embodiment of the present invention, the form 302 may also include means 330 to enter or select a level of impact and/or feasibility for each of a plurality 332 of predetermined drivers or business drivers. The means 330 may be fields, drop-down selection lists or the like, as illustrated in FIG. 3B. Examples of the different means 330 may include a "Risk Impact" drop-down selection list or field 330a; a "Growth Impact" drop-down selection list or field 330b; a Product and Service Impact" drop-down selection list or field 330c; a "Customer Delight Impact" drop-down selection list or field 330d; a "Productivity Impact" drop-down selection list or field 330e; an "Associate Satisfaction Impact" drop-down selection list or field 330f; an "Ease of Execution" drop-down selection list or field 330g; an "Implementation Cost" field 330h; and a "Current Phase" field 330i. The drop-down selection list may include a high (H), medium (M) and low (L) level of impact selection. An explanation, range or criteria for each level of impact may be provided in the drop-down list 330 as illustrated in FIG. 3B for the Risk Impact drop-down list 330a. Examples of criteria for the different levels of impact for the different business drivers are illustrated in Table 1 as follows:

TABLE 1

| Risk Impact | H | >$1 MM Lost Business or Brand Appeal in 6 mos. |
| | M | >$1 MM in Lost Business or Brand Appeal in 12 mos. |
| | L | >$250 M in Lost Business in 12 mos. |
| | | No Significant Impact on Risk |
| Growth Impact | H | >$5 MM in Revenue in 12 mos. |
| | M | >$2 MM in Revenue in 12 mos. |
| | L | >$500 M in Revenue in 12 mos. |
| | | <$500 M in Revenue |
| Product and Service Impact | H | >5% Performance Improvement in 12 mos. |
| | M | >3% Performance Improvement in 12 mos. |
| | L | >1% Performance Improvement in 12 mos. |
| | | <1% Performance Improvement in 12 mos. |
| Customer Delight Impact | H | Increase >2 Customer Delight Points |
| | M | Increase between 1 and 2 Customer Delight Points |
| | L | Increase between .5 and 1 Customer Delight Points |
| | | No Observable Impact on Customer Delight |

TABLE 1-continued

| | | |
|---|---|---|
| Productivity Impact | H | >$500 M HD Benefit or $1 MM Cost Avoidance |
| | M | >$250 M HD Benefit or $500 Cost Avoidance |
| | L | $100 M HD Benefit or $250 Cost Avoidance |
| | | No Significant Impact on Productivity |
| Associate Satisfaction Impact | H | >2 Pts. Increase in Sat. or >1% Turnover Decrease |
| | M | >1 Pts. Increase in Sat. or >.75% Turnover Decrease |
| | L | >.5 Pts. Increase in Sat. or >.5% Turnover Decrease |
| | | No Quantifiable Impact |

Examples of the "Ease of Execution" may be rated 1-5 as follows in Table 2:

TABLE 2

| | |
|---|---|
| 1 | Highly Cross-Functional and Cross Business |
| 2 | Highly Cross-Functional and Cross Business |
| 3 | Cross Functional |
| 4 | One Dimensional >6 mos. |
| 5 | One Dimensional <6 mos. |

Other criteria and levels of impact may be selected depending upon the particular circumstances, business, environment or the like.

The Current Phase field 330i may be automatically entered based on other inputs or actions by users of the holistic project management system.

Fields in form 302 that are required to be completed for project setup or entry may be identified or highlighted by a particular color or by other identifying means. Additionally, a message may be generated to indicate if a required field must be completed when a user attempts to save the information in the form 302.

Referring back to FIG. 1B, in block 110, a prioritization screen process or procedure may be run on a project proposal portfolio. The project proposal portfolio may be a group of projects that have been entered into the proposed project database 108 and that may be selected to be part of the project proposal portfolio. The prioritization screen process may include a process for determining a priority for each project in a proposed project portfolio. The priority may be determined as a function of a level of importance assigned to each of selected ones of the plurality of predetermined drivers and the impact that may be selected for each driver in form 302 as described above. FIG. 4 is an example of a web page, GUI 400 or the like of a spreadsheet illustrating examples of a level of importance or business driver weightings 402 for a holistic project management system in accordance with an embodiment of the present invention. The business driver weightings 402 may be for selected ones or major drivers of the plurality of predetermined drivers 332 (FIG. 3B). Examples of selected drivers 404 and each of their associated weighting or level of importance 402 are illustrated in FIG. 4. The business driver weightings or levels of importance 402 may be determined or calculated by a pair wise comparison between each major business driver 332 in FIG. 3B. These weightings coupled with the relative impact 330 of each project on these drivers 332 will automatically populate worksheets or spreadsheets, examples of which are discussed below. The spreadsheets or worksheets will automatically demonstrate which projects will have the most significant impact on the business most rapidly, and therefore, may lead the business to the most efficient and cost effective deployment of resources.

The GUI 400 may be presented to a user or accessed by operating or activating a radio button 204d in GUI 200 (FIG. 2) that may be labeled "Load Deployment Champion Project Dashboard" or a similar descriptive label to indicate functionality of the button 202d. FIG. 5 is an example of a web page, GUI 500 or the like including a menu for a user, deployment champion or the like to select different operations or views within a holistic project management system in accordance with an embodiment of the present invention. The GUI 500 illustrated in FIG. 5 may be presented to the user in response to operating the button 204d in GUI 200 of FIG. 2. The GUI 500 may include a group of radio buttons 502 that may be operated to perform or select the different operations or views. For example, a radio button 502c that may be labeled "Transfer Current Data to Project Metric Spreadsheets" or a similar descriptive label to indicate the button's function may be operated to transfer all current and pertinent data points related to a project to project metrics and prioritization spreadsheets. Examples of the project metrics and prioritization spreadsheets generable by the method 100 are described below with reference to FIGS. 4 and 6-8.

Figure 7A:
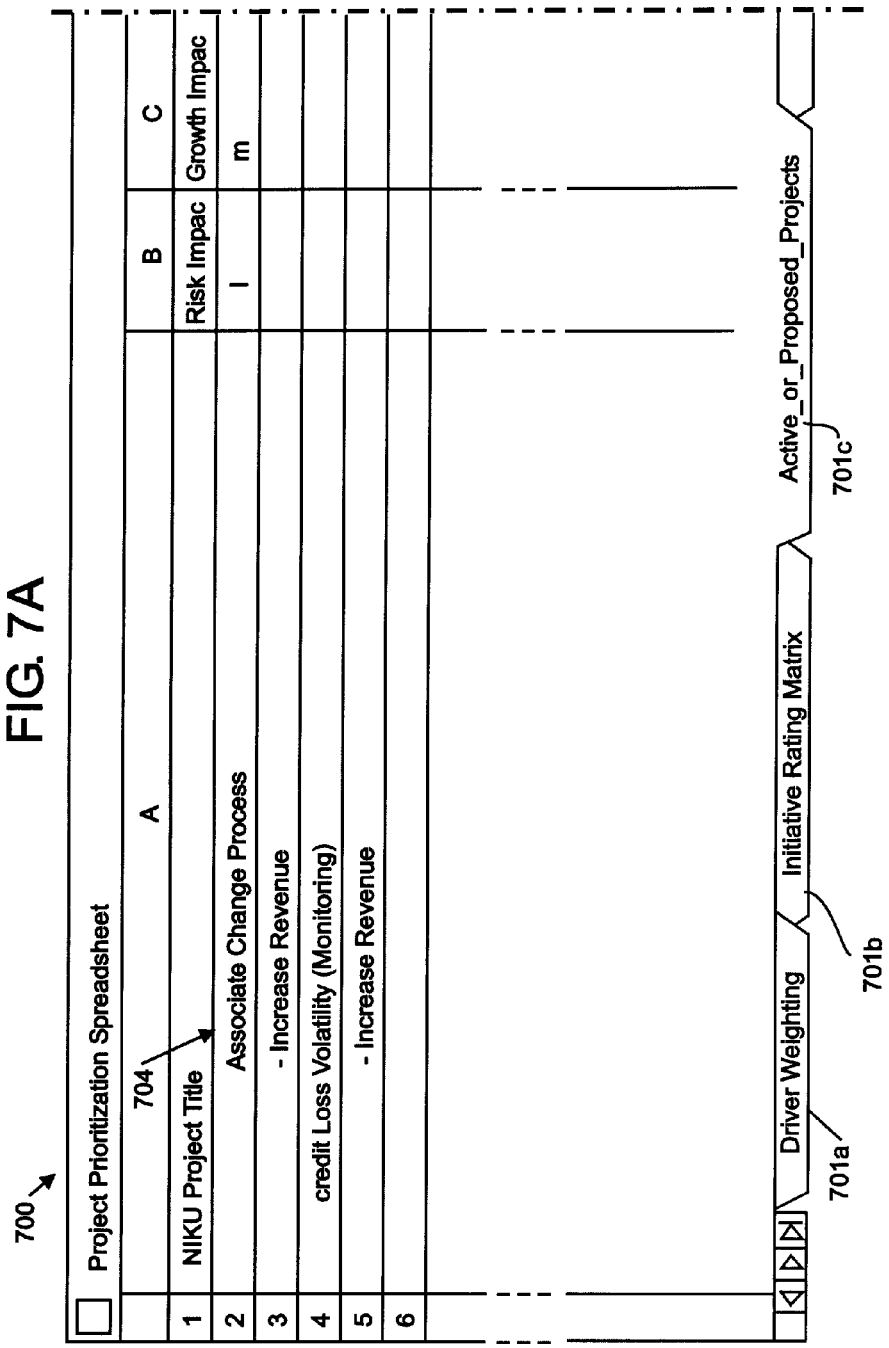

Referring back to FIG. 4, the different metrics and prioritization spreadsheets may be displayed by "clicking-on" or activating the different tabs that may be found at the base of the spreadsheets in FIGS. 4 and 6-8, such as tabs 401a-d in FIG. 4; tabs 601a-d in FIG. 6; tabs 701a-d in FIG. 7; and tabs 801a-d in FIG. 8. The tabs 401a-d, 601a-d, 701a-d and 801a-d respectively correspond to the same tab in each Figure and have the same label. GUI 400 corresponds to the tab 401a which may be labeled "Driver Weighting" or similar descriptive legend. By clicking-on the tab 401b in Initiative Rating Matrix may be presented to the user or manager. FIG. 6 is an example of a web page, GUI 600 or the like of an Initiative Rating Matrix 602 generable by a holistic project management system in accordance with an embodiment of the present invention. The Initiative Rating Matrix 602 may be a spreadsheet 604 illustrating examples of levels of impact 606 selected by a user in drop-down lists 330 (FIG. 3B) and weightings 608 for business drivers 610 for each project 612 entered in a holistic project management system. A priority rating 614 may be calculated for each driver 610 as a function of the selected level of impact 606 and the weighting 608 assigned to each driver 610. An overall priority rating 616 for each project 612 may be determined by summing the priority ratings 614 for each driver 610. The calculated rating 616 for a selected project may also be presented in a graphical form 618.

Returning to FIG. 4, an Active or Proposed Projects spreadsheet may be presented to the user or manger in response to clicking on tab 401c. The tab 401c may be labeled "Active or Proposed Projects" or a similar legend to indicate the subject matter of the spreadsheet associated with the tab 401c. FIG. 7 is an example of a web page, GUI 700 or the like of a spreadsheet 702 illustrating active or proposed projects generable by a holistic project management system in accordance with an embodiment of the present invention. The spreadsheet 702 may include a list 704 containing each active or proposed project and the selected level of impact 706 for each driver 708.

Returning to FIG. 4, a spreadsheet of projects and their respective priority ratings may be presented to a user or manager by clicking on a tab 401d. The tab 401d may be labeled "Projects with Priority Number" (shown best in FIG. 8 as tab 801d) or a similar label to indicate the subject matter contained in the spreadsheet associated with the tab 401d. FIG. 8 is an example of a web page, GUI 800 or the like of a spreadsheet 802 illustrating examples of priority percentage ratings 804 for each project 806 entered in a holistic project management system in accordance with an embodiment of the present invention.

Referring back to FIG. 1B, after the prioritization screen is run in block 110 and priority determined for each project in a project proposal portfolio and displayable in GUI 800, a determination may be made in block 112 if a predetermined priority threshold has been exceeded. Alternatively, a project or project portfolio with the highest priority may be selected in block 112. If no project or project portfolio is selected or the priority does not exceed the predetermined threshold, the method may return to block 110 to run the prioritization screen again with any new projects. Projects may be dropped from the project proposal portfolio if not selected after a predetermined time period. Projects may be dropped by using, operating or clicking on a deletion means, such as trash can 336 in GUI 300 of FIG. 3B, using a computer pointing device or the like.

If a predetermined priority has been meet or exceeded in block 110, the method may advance to block 114. In block 114, a determination may be made whether sufficient internal resources are available to conduct the project. If sufficient internal resources are determined to be available in block 114, the method 100 may advance to block 116. If sufficient internal resources are not available in block 116, the method 100 may advance to block 118. In block 118, a determination may be made if external resources are available to conduct the project or project portfolio. If external resources are not available in block 118, the method 100 may return to block 110 and the prioritization screen may be run again with any new projects or changes to projects already in the portfolio. If external resources are available in block 118, the method 100 may advance to block 116. In block 116, the project or request may be approved.

In block 119, a phase may be started to formally define the project. The define phase (block 119) may involve entities 102a-102f as illustrated in FIG. 1D. The formal define phase may involve defining the detailed steps or operations associated with the project and individuals or entities responsible for completing each of the steps or operations. In block 120, the project may be moved from a proposed phase or status to a define phase. The status may be indicated in the proposed project database 108 or database system. In block 122, the project may be entered into an approved project phase and may be entered into an approved project database 124 or database system.

In block 126, project principals may be notified of the projects selection. The project principals may be automatically notified by e-mail or other electronic means that may be automatically generated by the system or method 100 in response to entering the project in the project approved database 124. In a Six Sigma environment, the project principals may include the champion 102a, master black belt or black belt coach 102b, belt candidate 102f or the like. In block 128, the selected project may be entered into a tracking system 130 or the like, such as a certification automation system (CAS) as may be used in a Six Sigma environment. The tracking system 130 may include a quality and productivity financial management system (QPFM) and associated databases to manage the quality and productivity associated with conducting the project.

In one embodiment of the present invention, associated with a Six Sigma environment, a belt candidate 102f associated with the project may enroll in a Six Sigma class related to the project as indicated in block 131. The class may be conducted over a network, such as the Internet, intranet or private network constituting a virtual campus 132. In block 133, training of the black belt candidate may be conducted.

In block 134, the project may be conducted and controlled. Certification tollgates, such as in a Six Sigma environment or the like, may be utilized to conduct and control progress of the project. Conduct and control of the progress of the project may involve virtually all individuals or entities 102a-102h as illustrated in FIG. 1G. In block 136 (FIG. 1F), the project may be moved to control phase in the tracking system 130. In block 138, the project may be moved to a certified status in the tracking system, CAS, proposed projects database 108 or similar databases or tracking systems. Ongoing project governance 140 may occur starting at about block 118 and continuing to project completion or moving the project to a certified status or phase in block 138 or project completion. Ongoing updates 142 to the proposed projects database 108 and any other project monitoring databases or tracking systems, such as tracking system 130, may occur as tollgates are completed with respect to progression of the project from about block 128 to about block 138. In a Six Sigma environment or similar environment or process, the ongoing updates 142 may be made by the master black belt or black belt coach 102b or the like as illustrated in the embodiment of FIG. 1. There may also be ongoing updates 143 to the selected or approved project database 124 based on changes in the proposed project database 108. In a Six Sigma environment or similar environment or process, the ongoing updated 143 may be made by a data manager or the like as illustrated in the embodiment of FIG. 1.

Referring again to FIG. 2, coaches or managers may access the system to view and manage projects by activating or clicking-on a radio button 204a-204h in GUI 200 with a computer pointing device. Upon entry of a project into the system in GUI 300 (FIG. 3), the project may be automatically linked to the corresponding coach entered in one of fields 308.

Figure 9:
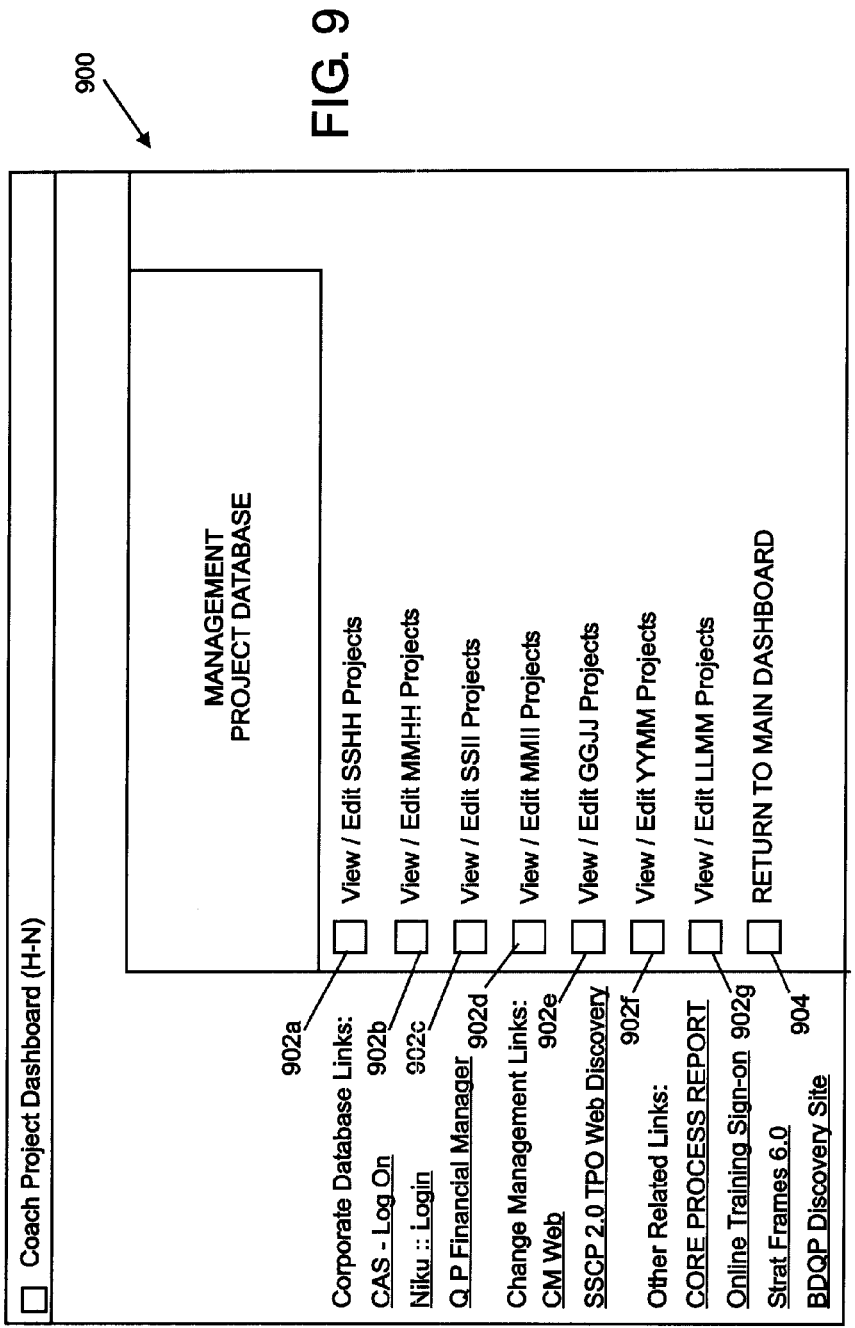
FIG. 9 is an example of a web page, GUI or the like of a menu to select project for viewing or editing in a holistic project management system in accordance with an embodiment of the present invention.

FIG. 9 is an example of a web page, GUI 900 or the like of a menu to select projects for viewing or editing in a holistic project management system in accordance with an embodiment of the present invention. The GUI 900 may be generated by the method 100 and may be accessed by a user, coach, manager or the like in response to operating or clicking-on an appropriate radio button 204e-204h in GUI 200. Each radio button 204e-204h may be labeled "Load Coach Project Dashboard" or a similar label to identify the function of the radio button 204e-204h. The radio buttons 204e-204h may also be divided by the initial of each coach's last name which may be indicated in the label as illustrated in GUI 900. The coach may then access the projects in his project portfolio by operating or clicking-on a radio button 902a-902g associated with his name. Each of the radio buttons 902a-902g may be labeled "View/Edit 'Coach's Name' Projects" or similar descriptive label. A radio button 904 that may be labeled "Return to Main Dashboard" or similar descriptive label of the button's function may be provided to return to the main dashboard or GUI 200 in response to activation of the button 904.

Figure 10C:
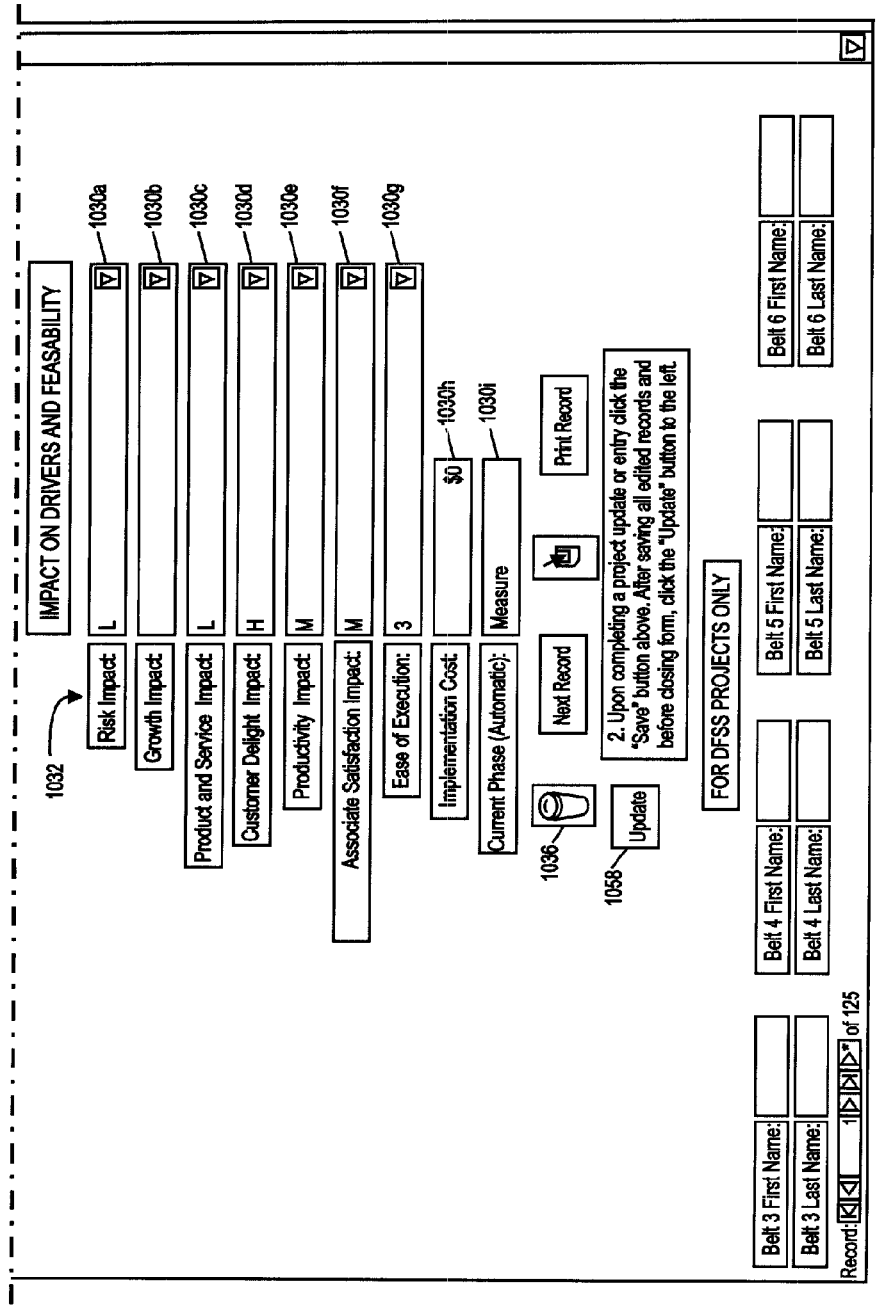

FIGS. 10A, 10B and 10C (collectively FIG. 10) are an example of a web page, GUI 1000 or the like illustrating an entry form 1002 for a project manager to enter or update information or data related to a project in a holistic project management system in accordance with an embodiment of the present invention. The GUI 1000 may be generated by the method 100 and may be accessed by a user, coach, manager or the like in response to operating or clicking-on a selected radio button 902 labeled with the coach's or manger's name or similar descriptive label. The form 1002 permits on going project management of a project in the system. The form 1002 may be similar to form 302 in GUI 300 (FIG. 3) and may include similar fields, such as "Project Era" field 1004, project type field 1006, Fields 1008 for entering and displaying names of individuals or project managers. Other similar fields to form 302 may include an "Expected Hard Benefit" field 1010; "Expected Soft Benefit" field 1012; "Date Proposed" field 1014; "Improvement Type" field 1016; "Impacted LOB" field 1018; "Total # of Belt Candidates" field 320; a project title field 1022; a business case field 1024; a problem statement field 1026; and a goal field 1028. The form 1002 may further include means 1030 or select a level of impact and/or feasibility for each plurality 332 of business drivers similar to those in form 302 (FIG. 3).

The form 1002 may also include fields for ongoing project management such as that described with respect to block 142 of method 100 in FIG. 1. To this end, the form 1002 may include a "Define Project Start Date" field 1038; a "Define Tollgate" field 1040 to enter a date a tollgate was completed; a "Measure Tollgate" field 1042 to enter a date of completion of tollgate measurement; an "Analyze Tollgate" field 1044 to enter a date of completion of tollgate analysis; an "Improve Tollgate" field 1046 to enter a date of completion of a tollgate improvement; a "Control Tollgate/Certification" field 1048; and a "Cancelled Date" field 1050 if the project in cancelled. The form 1002 may also include a "Reason Cancelled" field 1052 which may be a drop-down list to enter or select a reason why a project was cancelled. Fields may also be presented to enter a date a project was placed on hold 1054 and a reason why the project was placed on hold 1056. The holistic project management system may include an automatic function that changes the phase a project may be in responsive to entering dates for the tollgate and operating or clicking-on an update radio button 1058. The date the project was last updated may be indicated automatically in field 1060 (FIG. 10A)

FIG. 11 is an example of a web page, GUI 1100 or the like illustrating each coach's or project manager's projects by phase for a holistic project management system in accordance with an embodiment of the present invention. The GUI 1100 may be generated by the method 100 and may be accessed by a user, coach, manager or the like in response to operating or clicking-on a selected radio button 204 and/or 902 in GUIs 200 or 900, respectively. The number of projects assigned to each coach by phase may be presented in a table 1102. The number of projects assigned to each coach by phase may also be represented in GUI 1100 by a bar chart 1104. Examples of the different phases may be cancelled, certified, on hold or any similar phases or classifications that may be appropriate.

Figure 12:
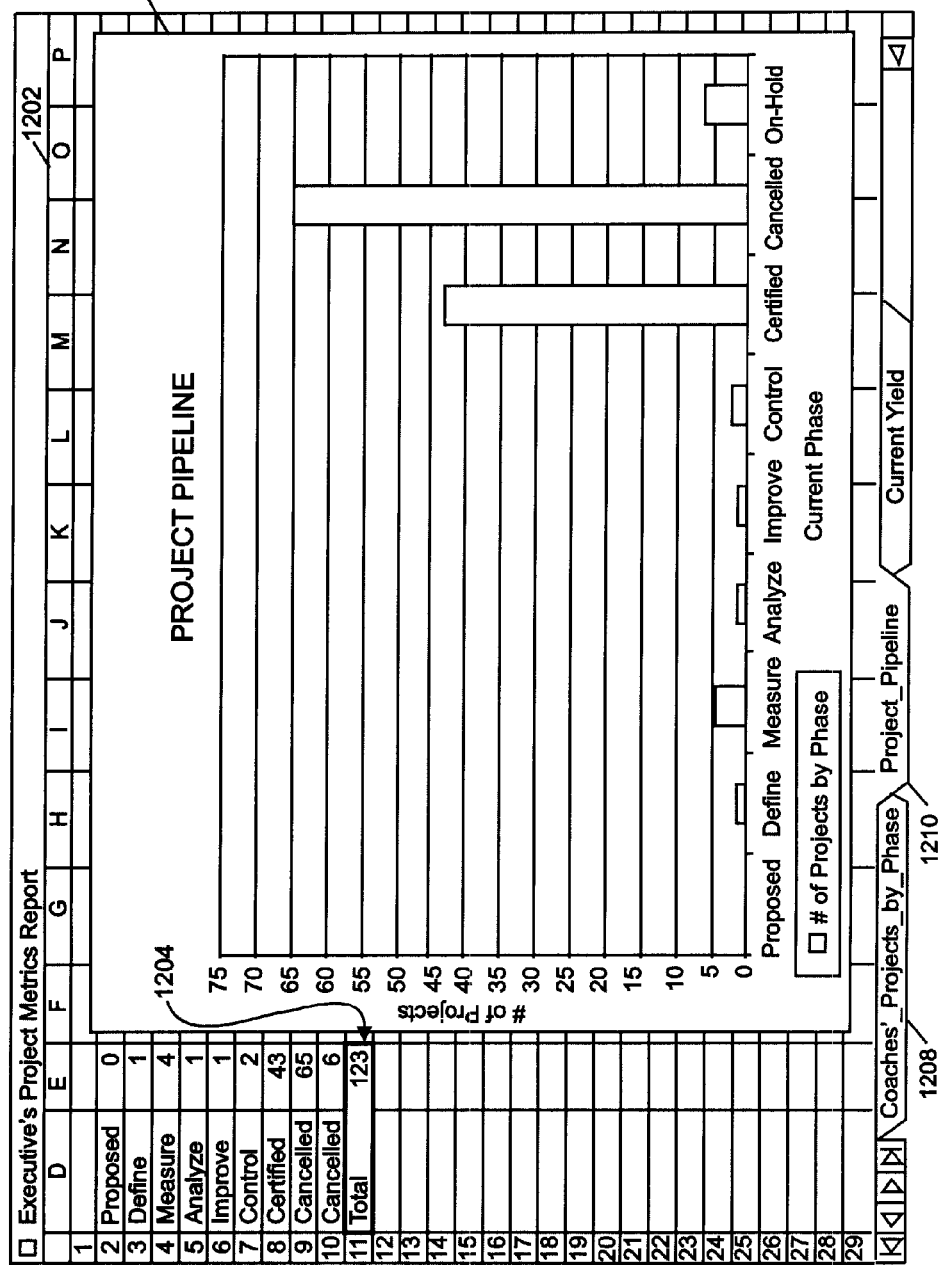
FIG. 12 is an example of a web page, GUI or the like illustrating a project metrics report that may be generated by a holistic project management system in accordance with an embodiment of the present invention.

FIG. 12 is an example of a web page, GU 1200 or the like illustrating a project metrics report 1202 that may be generated by a holistic project management system in accordance with an embodiment of the present invention. The GU 1200 may be generated by the method 100 and may be accessed by a user, coach, manager or the like in response to operating or clicking-on a selected radio button 204 and/or 902 in GUIs 200 or 900, respectively. The project metrics report 1202 may include a table 1204 illustrating a total number of projects and the number of projects in each classification or current phase. Examples of the different phases or classifications may include proposed, define, measure, analyze, improve, control, certified, cancelled, on-hold or any classification or phase that may be appropriate based on the circumstances. The project metrics report 1202 may also include a bar chart or the like illustrating a project pipeline 1206. The project pipeline 1206 may illustrate graphically the number of projects in each phase or category so that a coach or manager may see at a glance the status of all projects in the pipeline or the holistic project management system and their current respective statuses. A user may display GUI 1100 or the coaches' projects by phase 1104 illustrated in FIG. 11 by operating or clicking on a tab 1208 (corresponding to tab 1108 in FIG. 11) labeled "Coaches' Projects by Phase" or the like in FIG. 12. The user may switch back to GUI 1200 and the project pipeline 1206 by operating or clicking on a tab 1110 (corresponding to tab 1210 in FIG. 12) that may be labeled "Project Pipeline" or the like in FIG. 11.

FIG. 13 is a block diagram of an exemplary system 1300 for holistic project management in accordance with an embodiment of the present invention. The elements of the method 100 may be embodied in and performed by the system 1300. The system 1300 may include a computer system 1302 or similar system or device. The computer system 1302 may also be a communications device, such as a cellular telephone, mobile computing system, personal digital assistant or similar device capable of browsing or accessing the Internet, private network, intranet or the like.

The computer system 1302 may include a system memory or local file system 1304. The system memory 1304 may include a read only memory (ROM) 1306 and a random access memory (RAM) 1308. The ROM 1306 may include a basic input/output system (BIOS) 1310. The BIOS 1310 may contain basic routines that help to transfer information between elements or components of the computer system 1302. The RAM 1308 may contain an operating system 1312 to control overall operation of the computer system 1302. The RAM 1308 may also include a browser 1314 or web browser. The RAM 1308 may also include application programs 1315 that may be run or controlled by the operating system 1312. The RAM 1308 or application programs 1315 may also include data structures 1316 or computer-executable code for holistic project management that may be similar or include elements of the method 100 of FIG. 1. The RAM 1308 may further include other application programs 1318, other program modules, data 1320, files and the like.

The computer system 1302 may also include a processor or processing unit 1322 to control operations of the other components of the computer system 1302. The operating system 1312, browser 1314, data structures 1316 and other program modules 1320 may be operable on the processing unit 1322. The processing unit 1322 may be coupled to the memory system 1304 and other components of the computer system 1302 by a system bus 1324.

The computer system 1302 may also include a hard disk drive 1326. The hard drive 1326 may be coupled to the system bus 1324 by a hard drive interface 1328. The hard drive 1326 may also form part of the local file system 1304 or system memory. Programs, software and data may be transferred and exchanged between the system memory 1304 and the hard drive 1326 for operation of the computer system 1302.

The computer system 1302 may also include multiple input devices, output devices or combination input/output devices 1330 and 1332. Each input/output device 1330 and 1332 may be coupled to the system bus 1324 by an input/output interface 1334. The input and output devices or combination I/O devices 1330 and 1332 permit a user to operate and interface with the computer system 1302 and to control operation of the browser 1314 and data structures 1316 to access, operate and control the holistic project management system. The I/O devices 1330 may include a keyboard and computer pointing device or the like to perform the operations discussed herein.

The I/O devices 1332 may include disk drives, optical, mechanical, magnetic, or infrared input/output devices, modems or the like. The I/O devices 1332 may be used to access a medium 1336. The medium 1336 may contain, store, communicate or transport computer-readable or computer-executable instructions or other information for use by or in connection with a system, such as the computer system 1302.

The computer system 1302 may also include or be connected to a display or monitor 1338. The monitor 1338 may be coupled to the system bus 1324 by a video adapter 1340. The monitor 1338 may be used to permit the user to interface with the computer system 1302. The monitor 1338 may present the GUIs 200-1100 or web pages represented in FIGS. 2-11 to a user, coach or manger that may be generated by the data structures 1316 for holistic project management.

The computer system 1302 may communicate with a remote server 1342 and may access other servers or other computer systems (not shown) similar to computer system 1302 or the like via a network 1346. The computer system 1302 may also access databases or database systems 1348 via the network 1346. The databases or database systems may be associated with or used in conjunction with the holistic project management system, such as database systems 108, 124 and tracking system 130 of FIG. 1. The system bus 1324 may be coupled to the network 1346 by a network interface 1349. The network interface 1349 may be a modem, Ethernet card, router, gateway or the like for coupling to the network 1346. The coupling may be a wired connection or wireless. The network 1346 may be the Internet, private network, an intranet or the like.

In accordance with another embodiment of the present invention, the server 1342 may also include data structures 1350 for holistic project management and may include operations similar to those described with respect to method 100 for holistic project management in FIG. 1. Clients, such as computer system 1302 or the like, may access the data structures 1350 for holistic project management in accordance with an embodiment of the present invention. One or more databases or database systems 1352 may also be associated with the server 1342 for use in association with the data structures for holistic project management 1350 in the server 1342. The databases or databases systems 1352 may correspond to the databases or systems 108, 124 and 130 of FIG. 1.

Elements of the present invention, such as method 100 of FIG. 1 and system 1300 of FIG. 13, may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in the medium for use by or in connection with a system, such as system 1300 of FIG. 13. Examples of such a medium may be illustrated in FIG. 13 as network 1346 or medium 1336 and I/O devices 1332. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "downloaded" through a network, such as the Internet or the like. The computer-usable or readable medium could also be paper or another suitable medium upon which the program may be printed.

The method and system for holistic project management described above may provide an accurate feeder into multiple databases that may be used by an entity. The databases 1348 and 1352 may also provide backup to other databases of an entity. The method and system for holistic project management of the present invention may also provide a common reference site and reduce administrative requirements of coaches, managers or the like. The method and system of the present invention further provides user-friendly GUIs which can reduce the learning curve and provides a flexible tool for portfolio project management compared to other known systems.

Method and system for holistic project management of the present invention also captures project data and information from proposal through governance to completion. The method and system of the present invention also aggregates all project data and information into a common look and aids in generating team project metrics as a barometer or measure of success.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for holistic project management, comprising:
   presenting a graphical user interface for a user to enter project information for a project;
   assigning, using a computing device processor, a numerical weighting or a numerical level of importance to each of a plurality of predetermined drivers related to the project, wherein the numerical weighting or the numerical level of importance is assigned based on a pair wise comparison that illustrates a rapid impact on a business;
   determining a level of impact for each of the plurality of predetermined drivers for the project, wherein each level of impact corresponds to a predefined criteria, wherein the predetermined drivers include growth, product and service, customer delight, productivity, and associate satisfaction driver associated with the product;
   determining, using a computing device processor, a priority rating for each driver as a function of the assigned weighting for the driver and the selected level of impact for the driver; and
   presenting priority of the project compared to other projects based on determining a numerical priority for the project compared to a numerical priority of other projects, by summing the priority ratings for each of the plurality of drivers.

2. The method of claim 1, further comprising presenting a drop-down list of selectable impacts for each predetermined driver in the graphical user interface for the user to select.

3. The method of claim 1, further comprising providing means for selecting a level of impact for each of the plurality of predetermined drivers including:
   a risk driver;
   a growth driver;
   a product and service driver;
   a customer delight driver;
   a productivity driver; and
   an associate satisfaction driver,
   wherein providing means for select a level of impact includes presenting a high, medium and low level of impact and the predefined criteria associated with each level of impact.

4. The method of claim 1, further comprising providing means for entering or selecting an indication for each of the plurality of predetermined drivers including an ease of execution driver and an implementation cost driver.

5. The method of claim 1, wherein assigning a weighting or level of importance to each of the plurality of predetermined drivers comprises determining each weighting or level of importance by performing a pair wise comparison between each predetermined driver.

6. The method of claim 1, further comprising presenting a spreadsheet including the selected level of impact for each of the plurality of predetermined drivers for each project of a plurality of projects in a project portfolio.

7. The method of claim 1, further comprising presenting a spreadsheet including a priority for each project of a plurality of projects in a project portfolio.

8. The method of claim 1, further comprising presenting project pipeline data, project metrics and project yield data.

9. The method of claim 1, further comprising storing the entered project information in a project database.

10. The method of claim 1, further comprising approving the project for implementation in response to the priority relative to a priority of any other proposed projects and an availability of resources to implement the project.

11. The method of claim 10, further comprising:
storing the approved project in a project database in response to approving the project for implementation; and
automatically notifying project principals in response to approving the project for implementation.

12. The method of claim 11, further comprising updating the project database in response to each tollgate of a plurality of project tollgates being completed.

13. The method of claim 12, further comprising updating the project database in response to a change in status of the project.

14. The method of claim 12, further comprising removing any unapproved projects after a predetermined time period.

15. A method for holistic project management, comprising:
presenting a graphical user interface for a user to enter project information for a project;
assigning, using a computing device processor, a numerical weighting or a numerical level of importance to each of a plurality of predetermined drivers related to the project, wherein the numerical weighting or the numerical level of importance is assigned based on a pair wise comparison that illustrates a rapid impact on a business;
providing, using a computing device processor, means to select a level of impact for each of the plurality of predetermined drivers including a risk driver; a growth driver; a product and service driver; a customer delight driver; a productivity driver; and an associate satisfaction driver;
determining a level of impact for each of the plurality of predetermined drivers for the project, wherein each level of impact corresponds to a predefined criteria, wherein the predetermined drivers include growth, product and service, customer delight, productivity, and associate satisfaction driver associated with the product;
determining, using a computing device processor, a priority rating for each driver as a function of the level of importance assigned to each of the plurality of predetermined drivers and the impact selected for each driver; and
presenting priority of the project compared to other projects based on determining a numerical priority for the project compared to a numerical priority of other projects, by summing the priority ratings for each of the plurality of drivers.

16. The method of claim 15, further comprising providing means to enter or select an indication for each of the plurality of predetermined drivers including an ease of execution driver and an implementation cost driver.

17. The method of claim 15, further comprising presenting project pipeline data, project metrics and project yield data.

18. The method of claim 15, further comprising:
approving the project for implementation in response to the priority relative to a priority of any other proposed projects and an availability of resources to implement the project;
storing the approved project in a project database in response to approving the project for implementation;
automatically notifying project principals in response to approving the project for implementation; and
updating the project database in response to a change in status of the project.

19. A system for holistic project management, comprising:
a memory device with computer-readable program code stored thereon;
a processing device operatively coupled to the memory device, wherein the processing device is configured to execute the computer-readable program code to:
present a graphical user interface for a user to enter project information;
assign a numerical weighting or a numerical level of importance to each of a plurality of predetermined drivers related to the project, wherein the numerical weighting or the numerical level of importance is assigned based on a pair wise comparison that illustrates a rapid impact on a business;
select a level of impact for each of the plurality of predetermined drivers for the project, wherein each level of impact corresponds to a predefined criteria, wherein the predetermined drivers include growth, product and service, customer delight, productivity, and associate satisfaction driver associated with the product;
determine a priority rating for each driver as a function of the assigned weighting for the driver and the selected level of impact for the driver; and
present priority of the project compared to other projects based on determining a numerical priority for the project compared to a numerical priority of other projects, by summing the priority ratings for each of the plurality of drivers.

20. The system of claim 19, further comprising presenting a drop-down list of selectable impacts for each predetermined driver in the graphical user interface for the user to select.

21. The system of claim 19, further comprising providing means to select a level of impact for each of the plurality of predetermined drivers, wherein the plurality of predetermined drivers includes:
a risk driver;
a growth driver;
a product and service driver;
a customer delight driver;
a productivity driver; and
an associate satisfaction driver,
wherein providing means to select a level of impact includes presenting a high, medium and low level of impact and the predefined criteria associated with each level of impact.

22. The system of claim 19, further comprising providing means to enter or select an indication for each of the plurality of predetermined drivers, wherein the plurality of predetermined drivers includes an ease of execution driver and an implementation cost driver.

23. The system of claim 19, wherein assigning a weighting or level of importance to each of the plurality of predetermined drivers comprises determining each weighting or level of importance by performing a pair wise comparison between each predetermined driver.

24. The system of claim 19, further comprising presenting a spreadsheet including the selected level of impact for each of the plurality of predetermined drivers for each project of a plurality of projects in a project portfolio.

25. The system of claim 19, further comprising presenting project pipeline data, project metrics and project yield data.

26. A non-transitory computer-readable medium having computer executable instructions for performing a method, the method comprising:
   presenting a graphical user interface for a user to enter project information for a project;
   assigning a numerical weighting or a numerical level of importance to each of a plurality of predetermined drivers related to the project, wherein the numerical weighting or the numerical level of importance is assigned based on a pair wise comparison that illustrates a rapid impact on a business;
   determining a level of impact for each of the plurality of predetermined drivers for the project, wherein each level of impact corresponds to a predefined criteria, wherein the predetermined drivers include growth, product and service, customer delight, productivity, and associate satisfaction driver associated with the product;
   determining a priority rating for each driver as a function of the assigned weighting for the driver and the selected level of impact for the driver; and
   presenting priority of the project compared to other projects based on determining a numerical priority for the project compared to a numerical priority of other projects, by summing the priority ratings for each of the plurality of drivers.

27. The non-transitory computer-readable medium having computer executable instructions for performing the method of claim 26, the method further comprising: providing means to select a level of impact for each of the plurality of predetermined drivers including:
   a risk driver;
   a growth driver;
   a product and service driver;
   a customer delight driver;
   a productivity driver; and
   an associate satisfaction driver,
   wherein providing means to select a level of impact includes presenting a high, medium and low level of impact and the predefined criteria associated with each level of impact.

28. The non-transitory computer-readable medium having computer executable instructions for performing the method of claim 26, the method further comprising providing means to enter or select an indication for each of the plurality of predetermined drivers including an ease of execution driver and an implementation cost driver.

29. The non-transitory computer-readable medium having computer executable instructions for performing the method of claim 26, the method further comprising presenting a spreadsheet including the selected level of impact for each of the plurality of predetermined drivers for each project of a plurality of projects in a project portfolio.

30. The non-transitory computer-readable medium having computer executable instructions for performing the method of claim 26, the method further comprising presenting project pipeline data, project metrics and project yield data.

* * * * *